(12) United States Patent
Li et al.

(10) Patent No.: US 12,374,742 B1
(45) Date of Patent: Jul. 29, 2025

(54) LOWER PLASTIC MEMBER, END COVER ASSEMBLY, ENERGY STORAGE APPARATUS, AND POWER CONSUMING DEVICE

(71) Applicant: Xiamen Hithium Energy Storage Technology Co., Ltd., Fujian (CN)

(72) Inventors: Maosong Li, Fujian (CN); Jianming Zheng, Fujian (CN)

(73) Assignee: Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 19/070,118

(22) Filed: Mar. 4, 2025

(30) Foreign Application Priority Data

Mar. 6, 2024 (CN) .......................... 202410253859.7

(51) Int. Cl.
*H01M 50/15* (2021.01)
*H01M 50/16* (2021.01)
*H01M 50/176* (2021.01)

(52) U.S. Cl.
CPC ........... *H01M 50/15* (2021.01); *H01M 50/16* (2021.01); *H01M 50/176* (2021.01); *H01M 2220/10* (2013.01)

(58) Field of Classification Search
None
See application file for complete search history.

(56) References Cited

FOREIGN PATENT DOCUMENTS

| CN | 101112783 | A | 1/2008 | | |
|---|---|---|---|---|---|
| CN | 112151702 | A | 12/2020 | | |
| CN | 112371891 | A | 2/2021 | | |
| CN | 112872270 | A | 6/2021 | | |
| CN | 113823882 | A | 12/2021 | | |
| CN | 216120516 | U | 3/2022 | | |
| CN | 216903039 | U | 7/2022 | | |
| CN | 218215489 | | * | 1/2023 | ............ H01M 50/15 |
| CN | 218568944 | U | 3/2023 | | |
| CN | 115939489 | A | 4/2023 | | |
| CN | 116031549 | A | 4/2023 | | |
| CN | 116365123 | A | 6/2023 | | |

(Continued)

OTHER PUBLICATIONS

CNIPA, First Office Action corresponding Chinese Patent Application No. 202410253859.7, Apr. 12, 2024, 25 pages.

(Continued)

*Primary Examiner* — Amanda J Barrow

(74) *Attorney, Agent, or Firm* — IP Spring

(57) ABSTRACT

A lower plastic member, an end cover assembly, an energy storage apparatus, and a power consuming device are provided. The lower plastic member includes a body having a first surface and a second surface, an explosion-proof recessed platform having a first top surface and a first bottom wall, a first recessed platform having a second top surface and a second bottom wall, a second recessed platform having a third top surface and a third bottom wall, a first terminal-boss, and a second terminal-boss. A first surface-roughness A of each of the first surface, the second bottom wall, the third bottom wall, the fourth bottom wall, the fifth bottom wall is less than a second surface-roughness B of each of the second surface, the first bottom wall, the first top surface, the second top surface, the third top surface, the fourth top surface, and the fifth top surface.

20 Claims, 8 Drawing Sheets

(56) References Cited

FOREIGN PATENT DOCUMENTS

| | | | |
|---|---|---|---|
| CN | 116780127 | A | 9/2023 |
| CN | 116799447 | A | 9/2023 |
| CN | 116914335 | A | 10/2023 |
| CN | 219801087 | U | 10/2023 |
| CN | 220106696 | U | 11/2023 |
| CN | 117219934 | A | 12/2023 |
| CN | 117543143 | A | 2/2024 |
| JP | 2019036411 | A | 3/2019 |

OTHER PUBLICATIONS

CNIPA, Notification to Grant Patent Right for Invention for corresponding Chinese Patent Application No. 202410253859.7, May 8, 2024, 9 pages.
CNIPA, International Search Report for International Patent Application No. PCT/CN2024/137070, Jan. 21, 2025, 10 pages.
CNIPA, Written Opinion for International Patent Application No. PCT/CN2024/137070, Jan. 21, 2025, 10 pages.

\* cited by examiner

LOWER PLASTIC MEMBER, END COVER ASSEMBLY, ENERGY STORAGE APPARATUS, AND POWER CONSUMING DEVICE

CROSS-REFERENCE TO RELATED APPLICATIONS

This application claims priority under 35 U.S.C. § 119 (a) to Chinese Patent Application No. 202410253859.7, filed Mar. 6, 2024, the entire disclosure of which is incorporated herein by reference.

TECHNICAL FIELD

This disclosure relates to the field of energy storage technology, in particular to a lower plastic member, an end cover assembly, an energy storage apparatus, and a power consuming device.

BACKGROUND

Secondary batteries, also known as rechargeable batteries or storage batteries, refer to batteries that can be reused after active materials thereof are reactivated through charging following discharge. With the recyclable characteristics of the secondary battery, the secondary battery gradually becomes a main power source of a power consuming device. With the increasing demand of the secondary battery, people have higher and higher performance requirements for the secondary battery in various aspects, especially for the energy density per unit volume of the battery. The thickness of an end cover assembly of the battery is an important parameter affecting the energy density per unit volume of battery, and an excessively thick end cover assembly may reduce the energy density per unit volume of the battery. At present, the end cover assembly includes a lower plastic member used for insulation between an upper cover and a terminal. In order to improve the energy density per unit volume of the battery, the lower plastic member is usually designed to be very thin.

SUMMARY

In a first aspect, a lower plastic member for an end cover assembly of an energy storage apparatus is provided. The lower plastic member includes a body, an explosion-proof recessed platform, a first recessed platform, a second recessed platform, a first terminal-boss, and a second terminal-boss. The body has a first surface and a second surface positioned facing away from the first surface. The first surface is configured to be positioned at one side of the body facing towards an upper cover. The explosion-proof recessed platform is disposed at a middle part of the body in a length direction of the body and protrudes relative to the second surface. A top surface of the explosion-proof recessed platform protruding from the second surface is a first top surface. The explosion-proof recessed platform is recessed relative to the first surface. The explosion-proof recessed platform defines a gas collecting groove. A bottom wall of the gas collecting groove is a first bottom wall. The first recessed platform is disposed at one end of the body in the length direction of the body and protrudes relative to the second surface. A top surface of the first recessed platform protruding from the second surface is a second top surface. The first recessed platform is recessed relative to the first surface. The first recessed platform defines a first groove. A bottom wall of the first groove is a second bottom wall. The second recessed platform is disposed at one end of the body away from the first recessed platform in the length direction of the body, and protrudes relative to the second surface. A top surface of the second recessed platform protruding from the second surface is a third top surface. The second recessed platform is recessed relative to the first surface. The second recessed platform defines a second groove. A bottom wall of the second groove is a third bottom wall. The first terminal-boss is disposed at the body and between the explosion-proof recessed platform and the first recessed platform. The first terminal-boss protrudes relative to the first surface. A top surface of the first terminal-boss protruding from the first surface is a fourth top surface. The first terminal-boss is recessed relative to the second surface. The first terminal-boss defines a first terminal-groove. A bottom wall of the first terminal-groove is a fourth bottom wall. The second terminal-boss is disposed at the body and between the explosion-proof recessed platform and the second recessed platform. The second terminal-boss protrudes relative to the first surface. A top surface of the second terminal-boss protruding from the first surface is a fifth top surface. The second terminal-boss is recessed relative to the second surface. The second terminal-boss defines a second terminal-groove. A bottom wall of the second terminal-groove is a fifth bottom wall. The first surface is corresponding to the second surface. The first top surface is corresponding to the first bottom wall. The second top surface is corresponding to the second bottom wall. The third top surface is corresponding to the third bottom wall. The fourth top surface is corresponding to the fourth bottom wall. The fifth top surface is corresponding to the fifth bottom wall. Each of the first surface, the second bottom wall, the third bottom wall, the fourth bottom wall, and the fifth bottom wall has a first surface-roughness A. Each of the second surface, the first bottom wall, the first top surface, the second top surface, the third top surface, the fourth top surface, and the fifth top surface has a second surface-roughness B. The first surface-roughness A and the second surface-roughness B satisfy: A<B. The first surface-roughness A and the second surface-roughness B further satisfy: Ra0.02≤A≤Ra1.6, and Ra0.8≤B≤Ra12.5.

In a second aspect, an end cover assembly is provided in the present disclosure. The end cover assembly includes an upper cover and a lower plastic member. The lower plastic member includes a body, an explosion-proof recessed platform, a first recessed platform, a second recessed platform, a first terminal-boss, and a second terminal-boss. The body has a first surface and a second surface positioned facing away from the first surface. The first surface is configured to be positioned at one side of the body facing towards an upper cover. The explosion-proof recessed platform is disposed at a middle part of the body in a length direction of the body and protrudes relative to the second surface. A top surface of the explosion-proof recessed platform protruding from the second surface is a first top surface. The explosion-proof recessed platform is recessed relative to the first surface. The explosion-proof recessed platform defines a gas collecting groove. A bottom wall of the gas collecting groove is a first bottom wall. The first recessed platform is disposed at one end of the body in the length direction of the body and protrudes relative to the second surface. A top surface of the first recessed platform protruding from the second surface is a second top surface. The first recessed platform is recessed relative to the first surface. The first recessed platform defines a first groove. A bottom wall of the first groove is a second bottom wall. The second recessed platform is disposed at one end of the body away from the first recessed platform in the length direction of the body, and protrudes relative to the second surface. A top surface of the second recessed platform protruding from the second surface is a third top surface. The second recessed platform is recessed relative to the first surface. The second recessed platform defines a second groove. A bottom wall of the second groove is a third bottom wall. The first terminal-boss is disposed at the body and between the explosion-proof recessed platform and the first recessed platform. The first terminal-boss protrudes relative to the first surface. A top surface of the first terminal-boss protruding from the first surface is a fourth top surface. The first terminal-boss is recessed relative to the second surface. The first terminal-boss defines a first terminal-groove. A bottom wall of the first terminal-groove is a fourth bottom wall. The second terminal-boss is disposed at the body and between the explosion-proof recessed platform and the second recessed platform. The second terminal-boss protrudes relative to the first surface. A top surface of the second terminal-boss protruding from the first surface is a fifth top surface. The second terminal-boss is recessed relative to the second surface. The second terminal-boss defines a second terminal-groove. A bottom wall of the second terminal-groove is a fifth bottom wall. The first surface is corresponding to the second surface. The first top surface is corresponding to the first bottom wall. The second top surface is corresponding to the second bottom wall. The third top surface is corresponding to the third bottom wall. The fourth top surface is corresponding to the fourth bottom wall. The fifth top surface is corresponding to the fifth bottom wall. Each of the first surface, the second bottom wall, the third bottom wall, the fourth bottom wall, and the fifth bottom wall has a first surface-roughness A. Each of the second surface, the first bottom wall, the first top surface, the second top surface, the third top surface, the fourth top surface, and the fifth top surface has a second surface-roughness B. The first surface-roughness A and the second surface-roughness B satisfy: A<B. The first surface-roughness A and the second surface-roughness B further satisfy: Ra0.02≤A≤Ra1.6, and Ra0.8≤B≤Ra12.5. The first surface of the lower plastic member is positioned facing towards the upper cover.

In a third aspect, an energy storage apparatus is provided in the present disclosure. The energy storage apparatus includes a housing, a cell assembly, and an end cover assembly. The end cover assembly includes an upper cover and a lower plastic member. The lower plastic member includes a body, an explosion-proof recessed platform, a first recessed platform, a second recessed platform, a first terminal-boss, and a second terminal-boss. The body has a first surface and a second surface positioned facing away from the first surface. The first surface is configured to be positioned at one side of the body facing towards an upper cover. The explosion-proof recessed platform is disposed at a middle part of the body in a length direction of the body and protrudes relative to the second surface. A top surface of the explosion-proof recessed platform protruding from the second surface is a first top surface. The explosion-proof recessed platform is recessed relative to the first surface. The explosion-proof recessed platform defines a gas collecting groove. A bottom wall of the gas collecting groove is a first bottom wall. The first recessed platform is disposed at one end of the body in the length direction of the body and protrudes relative to the second surface. A top surface of the first recessed platform protruding from the second surface is a second top surface. The first recessed platform is recessed relative to the first surface. The first recessed platform defines a first groove. A bottom wall of the first groove is a second bottom wall. The second recessed platform is disposed at one end of the body away from the first recessed platform in the length direction of the body, and protrudes relative to the second surface. A top surface of the second recessed platform protruding from the second surface is a third top surface. The second recessed platform is recessed relative to the first surface. The second recessed platform defines a second groove. A bottom wall of the second groove is a third bottom wall. The first terminal-boss is disposed at the body and between the explosion-proof recessed platform and the first recessed platform. The first terminal-boss protrudes relative to the first surface. A top surface of the first terminal-boss protruding from the first surface is a fourth top surface. The first terminal-boss is recessed relative to the second surface. The first terminal-boss defines a first terminal-groove. A bottom wall of the first terminal-groove is a fourth bottom wall. The second terminal-boss is disposed at the body and between the explosion-proof recessed platform and the second recessed platform. The second terminal-boss protrudes relative to the first surface. A top surface of the second terminal-boss protruding from the first surface is a fifth top surface. The second terminal-boss is recessed relative to the second surface. The second terminal-boss defines a second terminal-groove. A bottom wall of the second terminal-groove is a fifth bottom wall. The first surface is corresponding to the second surface. The first top surface is corresponding to the first bottom wall. The second top surface is corresponding to the second bottom wall. The third top surface is corresponding to the third bottom wall. The fourth top surface is corresponding to the fourth bottom wall. The fifth top surface is corresponding to the fifth bottom wall. Each of the first surface, the second bottom wall, the third bottom wall, the fourth bottom wall, and the fifth bottom wall has a first surface-roughness A. Each of the second surface, the first bottom wall, the first top surface, the second top surface, the third top surface, the fourth top surface, and the fifth top surface has a second surface-roughness B. The first surface-roughness A and the second surface-roughness B satisfy: A<B. The first surface-roughness A and the second surface-roughness B further satisfy: Ra0.02≤A≤Ra1.6, and Ra0.8≤B≤Ra12.5. The first surface of the lower plastic member is positioned facing towards the upper cover. The cell assembly is disposed in the housing. The end cover assembly is connected to the housing.

In a fourth aspect, a power consuming device is provided in the present disclosure. The power consuming apparatus includes a power consuming apparatus and the energy storage apparatus in the third aspect. The energy storage apparatus is configured to supply power to the power consuming apparatus.

BRIEF DESCRIPTION OF THE DRAWINGS

To more clearly describe implementations in the present disclosure or technical solutions in related art, the accompanying drawings that need to be used in description of implementations or the related art will be briefly introduced below. Apparently, the accompanying drawings in the following description are only some implementations in the present disclosure, and those of ordinary skill in the art may also obtain other accompanying drawings based on these accompanying drawings without creative effort.

Figure 1:
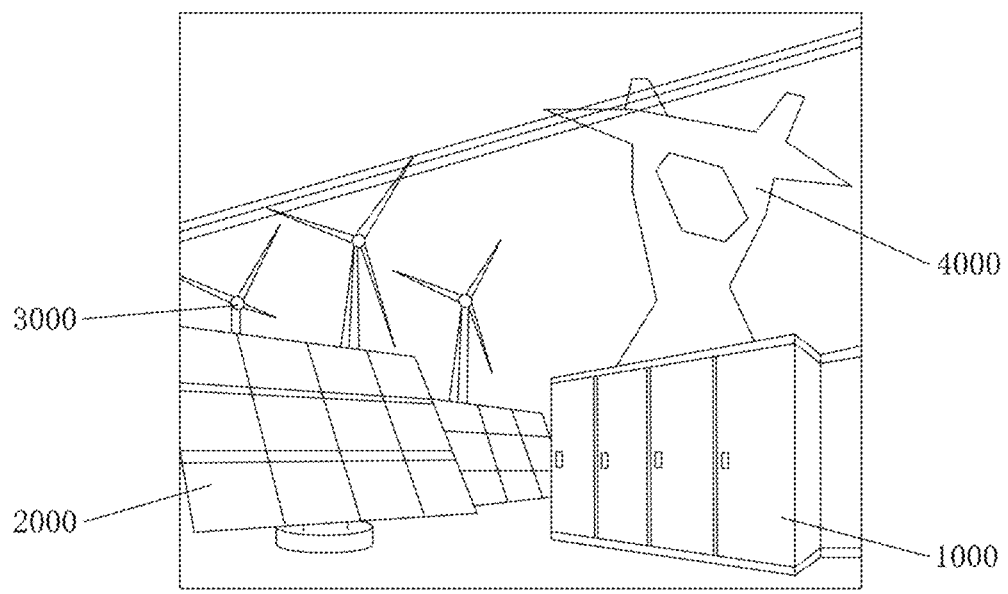
FIG. 1 is a view of an application scenarios of an energy storage apparatus according to an embodiment.

Description of reference signs of the accompanying drawings: 1000—energy storage apparatus, 2000—photovoltaic panel, 3000—wind turbine, 4000—power grid, 10—lower plastic member, 11—body, 111—first surface, 112—second surface, 12—explosion-proof recessed platform, 121—first boss, 1211—first top sub-surface, 1212—first bottom sub-wall, 1213—first vent hole, 122—second boss, 1221—second top sub-surface, 1222—second bottom sub-wall, 1223—second vent hole, 123—gas collecting groove, 124—first outer side-surface, 125—first inner sidewall, 13—first recessed platform, 131—second top surface, 132—second outer side-surface, 133—first groove, 134—second inner sidewall, 135—second bottom wall, 136—first leakage hole, 137—first reinforcing rib, 1371—third surface, 138—first recess, 14—second recessed platform, 141—third top surface, 142—third outer side-surface, 143—second groove, 144—third inner sidewall, 145—third bottom wall, 146—second leakage hole, 147—second reinforcing rib, 1471—fourth surface, 148—second recess, 15—first terminal-boss, 151—fourth top surface, 152—fourth outer side-surface, 153—first terminal-groove, 154—fourth inner sidewall, 155—fourth bottom wall, 156—first terminal-hole, 16—second terminal-boss, 161—fifth top surface, 162—fifth outer side-surface, 163—second terminal-groove, 164—fifth inner sidewall, 165—fifth bottom wall, 166—second terminal-hole, 17—anti-rotation post, 171—sixth top surface, 18—micro-texture, 19—connecting rib, 201—mold-mating plane, 21—first mold, 211 first molding surface, 212—first molding groove, 213—push hole, 22—second mold, 221—second molding surface, 222—second molding groove, 223—butting portion, 224—butting surface, 225—pouring hole, X-first direction, Y-second direction, Z-third direction, 20—upper cover, 100—end cover assembly, 200—housing, 300—cell assembly, 1100—power consuming apparatus, 5000—power consuming device.

DETAILED DESCRIPTION

Technical solutions of implementations in the present disclosure will be described clearly and completely below with reference to accompanying drawings in implementations of the present disclosure. Apparently, implementations described herein are merely some implementations, rather than all implementations, of the present disclosure. Based on implementations of the present disclosure, all other implementations obtained by those of ordinary skill in the art without creative effort shall fall within the protection scope of the present disclosure.

It may be noted that when an assembly is referred to as "fixed to" another assembly, the assembly may be directly positioned on the other assembly or an intermediate assembly may exist therebetween. When an assembly is referred to as "connected to" another assembly, the assembly may be directly connected to the other assembly or an intermediate assembly may exist therebetween simultaneously.

Unless otherwise defined, all technical and scientific terms used in the present disclosure have the same meaning as commonly understood by those of ordinary skill in the art of the present disclosure. The terms used in the detailed description in the present disclosure are for the purpose of describing specific embodiments only and are not intended to limit the present disclosure. The term "and/or" in the present disclosure includes any and all combinations of one or more related listed items.

The following will describe in detail some implementations of the present disclosure with reference to the accompanying drawings. Various embodiments and features therein may be implemented in any combination with each other without conflict.

Since energy required by people has strong temporal and spatial characteristics, in order to use energy in a reasonable manner and improve energy utilization, a medium or a device is required to store energy in the same energy form or in another energy form converted and then to release energy in a specific energy form based on requirements of future applications. As is known to all, in order to achieve the purpose of carbon neutralization, the main way to generate green electric energy at present is to develop green energy such as photovoltaic and wind power to replace fossil energy. At present, generation of green electric energy is generally dependent on photovoltaics, wind power, water potential, and the like. However, in general, wind energy, solar energy, and the like are strongly intermittent and volatile, resulting in an unstable power grid, insufficient power supply at a power consumption peak, and overmuch power supply at a power consumption valley. In addition, an unstable voltage may further damage electric power. Therefore, "curtailment of wind and photovoltaics" may occur due to insufficient power demand or insufficient power-grid admitting ability, and energy storage is required to solve these problems. That is, electric energy is stored by converting it into other forms of energy by physical or chemical means, and energy is released by converting it into electric energy when needed. In brief, energy storage is similar to a large "power bank", which stores electric energy when photovoltaics and wind energy are sufficient and releases stored electric power when needed.

Taking electrochemical energy storage as an example, an energy storage apparatus is provided in the present disclosure. The energy storage apparatus includes one group of chemical batteries. Chemical elements in the chemical batteries can be used as an energy storage medium to implement a charging/discharging process through chemical reaction or change of the energy storage medium. In brief, electric energy generated by solar energy and wind energy is stored in the chemical batteries. When the usage of external electric energy reaches a peak, the power stored in the chemical batteries is released for use, or is transferred to a place where the power is scarce for reuse.

At present, energy storage may be applied in various application scenarios, including (wind/solar) power-generation-side energy storage, grid-side energy storage, basestation-side energy storage, user-side energy storage, etc. Corresponding types of energy storage apparatuses include the following.

(1) A large-sized energy storage container applied in a grid-side energy-storage scenario. The energy storage container may serve as a high-quality active and reactive regulation power source in the grid, which can realize matching of electric energy loads in time and space, enhance the capacity for integration of renewable energy, and is of great significance in the backup of the grid system, relieving the pressure of power supply at a peak load, and peak shaving and frequency modulation.

(2) A small and medium-sized energy storage cabinet applied in a user-side industrial and commercial energy-storage scenario (banks, shopping malls, etc.). The small and medium-sized energy storage cabinet mainly operates in a "peak shaving and valley filling" mode. Based on the demand for electricity, there may be a significant price difference in electricity prices at peak and valley periods. When the user has an energy storage device, in order to reduce cost, an energy storage cabinet/box may be usually charged during an electricity-price valley period, and the electricity in the energy storage device may be usually released for use during the electricity-price peak period to save electricity cost.

At present, the lower plastic member is manufactured by using an injection molding process. When demolding is performed after injection molding is completed, a mold pulls the lower plastic member, which easily results in damage to the lower plastic member. In addition, an electrolyte in an energy storage apparatus may be splashed onto the lower plastic member and remain on the lower plastic member. As a result, the content of the electrolyte in a cell assembly may be reduced, a utilization rate of the electrolyte may be reduced, and the service life of the energy storage apparatus may be shortened.

The present disclosure aims to provide a lower plastic member, an end cover assembly, an energy storage apparatus, and a power consuming device. Therefore, problems, that the lower plastic member is damaged during demolding, and a utilization rate of an electrolyte is reduced and the service life of the energy storage apparatus is shortened due to the electrolyte remaining on the lower plastic member, are solved.

In order to realize the purpose of the present disclosure, the present disclosure provides the following technical solution.

In a first aspect, a lower plastic member for an end cover assembly of an energy storage apparatus is provided. The lower plastic member includes a body, an explosion-proof recessed platform, a first recessed platform, a second recessed platform, a first terminal-boss, and a second terminal-boss. The body has a first surface and a second surface positioned facing away from the first surface. The first surface is configured to be positioned at one side of the body facing towards an upper cover. The explosion-proof recessed platform is disposed at a middle part of the body in a length direction of the body and protrudes relative to the second surface. A top surface of the explosion-proof recessed platform protruding from the second surface is a first top surface. The explosion-proof recessed platform is recessed relative to the first surface. The explosion-proof recessed platform defines a gas collecting groove. A bottom wall of the gas collecting groove is a first bottom wall. The first recessed platform is disposed at one end of the body in the length direction of the body and protrudes relative to the second surface. A top surface of the first recessed platform protruding from the second surface is a second top surface. The first recessed platform is recessed relative to the first surface. The first recessed platform defines a first groove. A bottom wall of the first groove is a second bottom wall. The second recessed platform is disposed at one end of the body away from the first recessed platform in the length direction of the body, and protrudes relative to the second surface. A top surface of the second recessed platform protruding from the second surface is a third top surface. The second recessed platform is recessed relative to the first surface. The second recessed platform defines a second groove. A bottom wall of the second groove is a third bottom wall. The first terminal-boss is disposed at the body and between the explosion-proof recessed platform and the first recessed platform. The first terminal-boss protrudes relative to the first surface. A top surface of the first terminal-boss protruding from the first surface is a fourth top surface. The first terminal-boss is recessed relative to the second surface. The first terminal-boss defines a first terminal-groove. A bottom wall of the first terminal-groove is a fourth bottom wall. The second terminal-boss is disposed at the body and between the explosion-proof recessed platform and the second recessed platform. The second terminal-boss protrudes relative to the first surface. A top surface of the second terminal-boss protruding from the first surface is a fifth top surface. The second terminal-boss is recessed relative to the second surface. The second terminal-boss defines a second terminal-groove. A bottom wall of the second terminal-groove is a fifth bottom wall. The first surface is corresponding to the second surface. The first top surface is corresponding to the first bottom wall. The second top surface is corresponding to the second bottom wall. The third top surface is corresponding to the third bottom wall. The fourth top surface is corresponding to the fourth bottom wall. The fifth top surface is corresponding to the fifth bottom wall. Each of the first surface, the second bottom wall, the third bottom wall, the fourth bottom wall, and the fifth bottom wall has a first surface-roughness A. Each of the second surface, the first bottom wall, the first top surface, the second top surface, the third top surface, the fourth top surface, and the fifth top surface has a second surface-roughness B. The first surface-roughness A and the second surface-roughness B satisfy: A<B. The first surface-roughness A and the second surface-roughness B further satisfy: Ra0.02≤A≤Ra1.6, and Ra0.8≤B≤Ra12.5.

By setting the first surface-roughness of the first surface and the second surface-roughness of the second surface to satisfy A<B, after the lower plastic member is mounted to the energy storage apparatus, the electrolyte splashed on the relatively flat and smooth first surface can spread flat and then flow back to the cell assembly along an edge of the first surface, and droplets of the electrolyte splashed on the relatively rough second surface can form hanging hemispheres and can fall back to the cell assembly with a slight vibration. Therefore, the electrolyte splashed on the lower plastic member can return to the cell assembly to construct an ion channel between the positive electrode and the negative electrode, the electrolyte is prevented from remaining on the lower plastic member and does not participate in the electrochemical reaction of the cell assembly, the utilization rate of the electrolyte is improved, and thus the service life of the energy storage apparatus is prolonged. By setting the second surface-roughness of the second surface to satisfy A<B, the second surface is rougher than the first surface. When a second mold is demolded, a gas can enter a space between the lower plastic member and the second mold through a microscopic gap between the relatively rough second surface and the second mold, to avoid the difficulty of demolding due to the large adsorption force generated between the second surface and the second mold, so that the second mold is easier to separate from the lower plastic member than a first mold. That is, when the second mold is separated from the lower plastic member, the first mold still tightly absorbs the lower plastic member, so that the second mold is prevented from pulling out a local structure of the lower plastic member, and then the lower plastic member is prevented from being locally deformed and damaged, thereby improving the product yield.

In an implementation, the first surface-roughness A and the second surface-roughness B further satisfy: Ra0.02≤A≤Ra1.6, and Ra0.8≤B≤Ra12.5.

By setting the first surface-roughness of the first surface to satisfy Ra0.02≤A≤Ra1.6 and setting the second surface-roughness of the second surface to satisfy Ra0.8≤B≤Ra12.5, after the lower plastic member is mounted to the energy storage apparatus, the electrolyte splashed on the relatively flat and smooth first surface can spread flat and then flow back to the cell assembly along an edge of the first surface, and droplets of the electrolyte splashed on the relatively rough second surface can form hanging hemispheres and can fall back to the cell assembly with a slight vibration. Therefore, the electrolyte splashed on the lower plastic member can return to the cell assembly to construct an ion channel between the positive electrode and the negative electrode, the electrolyte is prevented from remaining on the lower plastic member and does not participate in the electrochemical reaction of the cell assembly, the utilization rate of the electrolyte is improved, and thus the service life of the energy storage apparatus is prolonged.

In an implementation, the explosion-proof recessed platform includes one first boss and two second bosses. The first boss is disposed at a middle part of the body in a width direction of the body. Two ends of the first boss in the width direction of the body are connected to the two second bosses, respectively. A height of the first boss protruding relative to the second surface is less than a height of each second boss protruding relative to the second surface. The first top surface includes a first top sub-surface and two second top sub-surfaces. A top surface of the first boss protruding from the second surface is the first top sub-surface. Top surfaces of the two second bosses protruding from the second surface are the two second top sub-surfaces. Each of the first top sub-surface and the two second top sub-surfaces has the second surface-roughness. By setting the height of the first boss relative to the second surface to be less than the height of the second boss relative to the second surface, when the second boss is in contact with the cell assembly, there is still a certain gap between the first boss and the cell assembly, so that gas can flow between the left and right sides of the explosion-proof recessed platform (that is, the two sides of the explosion-proof recessed platform in the length direction of the body) through the gap between the first boss and the cell assembly, so as to avoid the abnormality caused by local gas accumulation. In addition, some devices can also be arranged in the gap to maximize the use of space and facilitate the miniaturization of the energy storage apparatus. By setting the first top sub-surface and the two second top sub-surfaces to have the second surface-roughness, the droplet of the electrolyte can be in a hanging shape, and can fall back to the cell assembly with a slight vibration, to provide the ion channel for the positive electrode and the negative electrode. Moreover, it is easy for the lower plastic member to be separated from the mold during demolding, so that the lower plastic member is prevented from being locally deformed and damaged, thereby improving the product yield.

In an implementation, the first bottom wall includes a first bottom sub-wall and two second bottom sub-walls. A depth of the first boss recessed relative to the first surface is less than a depth of each second boss recessed relative to the first surface. Part of the bottom wall of the gas collecting groove corresponding to the first boss is the first bottom sub-wall. Parts of the bottom wall of the gas collecting groove corresponding to the two second bosses are the two second bottom sub-walls. Each of the first bottom sub-wall and the two second bottom sub-walls has the second surface-roughness. A distance between the first bottom sub-wall and the first surface is less than a distance between the second bottom sub-wall and the first surface, and the height of the first top sub-surface relative to the second surface is less than the height of the second top sub-surface relative to the second surface, so that the wall thickness of the bottom wall of the first boss and the wall thickness of the bottom wall of the second boss can be approximately uniform, and the situation that the wall thickness is locally too thick or locally too thin can be avoided, thereby ensuring the structural strength. In order to facilitate demolding, since the rougher surface is more conducive to demolding, the first bottom sub-wall and the second bottom sub-wall are also set to have the second surface-roughness. Therefore, it is easier to demold, and deformation and damage of the lower plastic member at the first boss and the second boss caused by the difficulty in demolding the first boss and the second boss from the first mold can be avoided.

In an implementation, the explosion-proof recessed platform has a first outer side-surface. The first recessed platform has a second outer side-surface. The second recessed platform has a third outer side-surface. The first outer side-surface is connected to the second surface and the first top surface. The second outer side-surface is connected to the second surface and the second top surface. The third outer side-surface is connected to the second surface and the third top surface. Each of the first outer side-surface, the second outer side-surface, and the third outer side-surface has the first surface-roughness. By setting the first outer side-surface, the second outer side-surface, and the third outer side-surface to have the first surface-roughness, the first outer side-surface, the second outer side-surface, and the third outer side-surface are relatively flat and smooth, so that the friction force between the second mold and each of the first outer side-surface, the second outer side-surface, and the third outer side-surface can be reduced. Therefore, it is conducive to demolding, the deformation of the lower plastic member caused by the pulling of the second mold can be avoided, and thus the product yield is prevented from being reduced.

In one embodiment, a sidewall of the gas collecting groove is a first inner sidewall. A sidewall of the first groove is a second inner sidewall. A sidewall of the second groove is a third inner sidewall. Each of the first inner sidewall, the second inner sidewall, and the third inner sidewall is connected to the first surface, and has the first surface-roughness. By setting the first inner sidewall, the second inner sidewall, and the third inner sidewall each to have the first surface-roughness, the first inner sidewall, the second inner sidewall, and the third inner sidewall are relatively flat and smooth, so that the friction force between the first mold and each of the first inner sidewall, the second inner sidewall, and the third inner sidewall can be reduced. Therefore, it is conducive to demolding, the deformation of the lower plastic member caused by the pulling of the first mold is avoided, and thus the product yield is prevented from being reduced.

In an implementation, the lower plastic member further includes multiple first reinforcing ribs and multiple second reinforcing ribs. The multiple first reinforcing ribs all extend in the length direction of the body and are arranged at intervals in a width direction of the body. The multiple second reinforcing ribs all extend in the length direction of the body and are arranged at intervals in the width direction of the body. Each of the multiple first reinforcing ribs is connected to two opposite sidewalls of the first groove in the length direction of the body and the bottom wall of the first groove. Each of the multiple second reinforcing ribs is connected to two opposite sidewalls of the second groove in the length direction of the body and the bottom wall of the second groove. Each of the multiple first reinforcing ribs has a third surface. Each of the multiple second reinforcing ribs has a fourth surface. Each of the third surface and the fourth surface is flush with the first surface, and has the second surface-roughness. The first reinforcing ribs and the second reinforcing ribs can strengthen the structural strength of the first recessed platform and the second recessed platform in a first direction. The third surface and the fourth surface have the second surface-roughness to facilitate demolding, and the second surface-roughness can facilitate demolding.

In an implementation, each of the multiple first reinforcing ribs has a dimension ranging from 0.85 mm to 3.65 mm in the width direction of the body. Each of the multiple second reinforcing ribs has a dimension ranging from 0.85 mm to 3.65 mm in the width direction of the body. The first recessed platform defines multiple first recesses in the second top surface in a one-to-one correspondence with the multiple first reinforcing ribs. The second recessed platform defines multiple second recesses in the third top surface in a one-to-one correspondence with the multiple second reinforcing ribs. Each of the multiple first recesses is recessed from the second top surface and extends through two opposite outer side-surfaces of the first recessed platform in the length direction of the body. Each of the multiple second recesses is recessed from the third top surface and extends through two opposite outer side-surfaces of the second recessed platform in the length direction of the body. On condition that each of the thickness of the first reinforcing rib and the thickness of the second reinforcing rib ranges from 0.85 mm to 3.65 mm, when the injection molding is performed, during solidification of plastic liquid, the plastic at the position of the second top surface corresponding to the first reinforcing rib will shrink towards the first reinforcing rib to define the first recess, and the plastic at the position of the third top surface corresponding to the second reinforcing rib will shrink towards the second reinforcing rib to define the second recess. After the lower plastic member is mounted to the energy storage apparatus, each of the second top surface and the third top surface is in contact with the cell assembly, and there is a gap between the cell assembly and each of the first recess and the second recess. When the electrolyte is injected into the energy storage apparatus, and the electrolyte reaches a surface of the cell assembly positioned facing towards the lower plastic member, the electrolyte can flow to a sidewall surface and a bottom-wall surface of the cell assembly through the first recesses and the second recesses, to infiltrate the cell assembly from all directions, so that the infiltration efficiency is improved and the infiltration uniformity is ensured. Meanwhile, the first recess and the second recess can be used for ventilation. When the cell assembly generates gas, the gas can enter the space between the second surface and the cell assembly through the first recess and the second recess, and then enter the gas collecting groove through the vent hole. When a gas pressure is greater than a preset value, the pressure can be released through an explosion-proof valve, thereby improving the safety performance of the energy storage apparatus.

In an implementation, the first terminal-boss has a fourth outer side-surface. The second terminal-boss has a fifth outer side-surface. The fourth outer side-surface is connected to the first surface and the fourth top surface. The fifth outer side-surface is connected to the first surface and the fifth top surface. Each of the fourth outer side-surface and the fifth outer side-surface has the first surface-roughness. By setting the fourth outer side-surface and the fifth outer side-surface each to have the first surface-roughness, the fourth outer side-surface and the fifth outer side-surface are relatively flat and smooth, so that the friction force between the first mold and each of the fourth outer side-surface and the fifth outer side-surface can be reduced. Therefore, it is conducive to demolding, the deformation of the lower plastic member is caused by the pulling of the first mold is avoided, and thus the product yield is prevented from being reduced.

In an implementation, a sidewall of the first terminal-groove is a fourth inner sidewall. A sidewall of the second terminal-groove is a fifth inner sidewall. Each of the fourth inner sidewall and the fifth inner sidewall has the first surface-roughness. By setting the fourth inner sidewall and the fifth inner sidewall each to have the first surface-roughness, the fourth inner sidewall and the fifth inner sidewall are relatively flat and smooth, so that the friction force between the second mold and each of the fourth inner sidewall and the fifth inner sidewall can be reduced. Therefore, it is conducive to demolding, the deformation of the lower plastic member caused by the pulling of the second mold is avoided, and thus the product yield is prevented from being reduced.

In an implementation, the lower plastic member further includes an anti-rotation post connected to the body and protrudes from the first surface. A top surface of the anti-rotation post protruding from the first surface is a sixth top surface. An outer peripheral surface of the anti-rotation post is connected to the first surface and the sixth top surface and has the first surface-roughness. The sixth top surface has the second surface-roughness. By setting the outer peripheral surface of the anti-rotation post to have the first surface-roughness, the outer peripheral surface is relatively flat and smooth, so that the friction force between the first mold and the outer peripheral surface can be reduced. Therefore, it is conducive to demolding, the deformation of the lower plastic member caused by the pulling of the first mold can be avoided, and thus the product yield is prevented from being reduced. In addition, a radial dimension of the anti-rotation post is relatively small, that is, an area of the sixth top surface is relatively small. By setting the sixth top surface to have the second surface-roughness, the sixth top surface is relatively rough, so that it is conducive to demolding, and it is not necessary to use the push rod to push rod to push the sixth top surface.

In an implementation, the first surface has a micro-texture. The micro-texture extends in the length direction of the body or a width direction of the body. A dimension of the micro-texture protruding or recessed relative to the first surface ranges from 0.01 mm to 0.05 mm. The micro-texture can guide the electrolyte remaining on the first surface to flow in an extension direction of the micro-texture, so that the electrolyte on the first surface can be quickly guided to the edge of the first surface and flow to the cell assembly.

In an implementation, the lower plastic member is bent in a width direction of the lower plastic member. Two ends of the lower plastic member in the width direction of the lower plastic member are configured to be farther away from the upper cover than a middle part of the lower plastic member in the width direction of the lower plastic member. The lower plastic member is bent in a second direction, and the two ends of the lower plastic member in the width direction of the lower plastic member are set to be farther away from the upper cover than the middle part of the lower plastic member in the width direction of the lower plastic member, so that the electrolyte on the first surface can flow faster, the electrolyte is prevented from adhering to a gap between the first surface of the lower plastic member and a lower surface of the upper cover due to surface tension, and thus the electrolyte is able to flow back.

In a second aspect, an end cover assembly is provided in the present disclosure. The end cover assembly includes an upper cover and a lower plastic member. The lower plastic member includes a body, an explosion-proof recessed platform, a first recessed platform, a second recessed platform, a first terminal-boss, and a second terminal-boss. The body has a first surface and a second surface positioned facing away from the first surface. The first surface is configured to be positioned at one side of the body facing towards an upper cover. The explosion-proof recessed platform is disposed at a middle part of the body in a length direction of the body and protrudes relative to the second surface. A top surface of the explosion-proof recessed platform protruding from the second surface is a first top surface. The explosion-proof recessed platform is recessed relative to the first surface. The explosion-proof recessed platform defines a gas collecting groove. A bottom wall of the gas collecting groove is a first bottom wall. The first recessed platform is disposed at one end of the body in the length direction of the body and protrudes relative to the second surface. A top surface of the first recessed platform protruding from the second surface is a second top surface. The first recessed platform is recessed relative to the first surface. The first recessed platform defines a first groove. A bottom wall of the first groove is a second bottom wall. The second recessed platform is disposed at one end of the body away from the first recessed platform in the length direction of the body, and protrudes relative to the second surface. A top surface of the second recessed platform protruding from the second surface is a third top surface. The second recessed platform is recessed relative to the first surface. The second recessed platform defines a second groove. A bottom wall of the second groove is a third bottom wall. The first terminal-boss is disposed at the body and between the explosion-proof recessed platform and the first recessed platform. The first terminal-boss protrudes relative to the first surface. A top surface of the first terminal-boss protruding from the first surface is a fourth top surface. The first terminal-boss is recessed relative to the second surface. The first terminal-boss defines a first terminal-groove. A bottom wall of the first terminal-groove is a fourth bottom wall. The second terminal-boss is disposed at the body and between the explosion-proof recessed platform and the second recessed platform. The second terminal-boss protrudes relative to the first surface. A top surface of the second terminal-boss protruding from the first surface is a fifth top surface. The second terminal-boss is recessed relative to the second surface. The second terminal-boss defines a second terminal-groove. A bottom wall of the second terminal-groove is a fifth bottom wall. The first surface is corresponding to the second surface. The first top surface is corresponding to the first bottom wall. The second top surface is corresponding to the second bottom wall. The third top surface is corresponding to the third bottom wall. The fourth top surface is corresponding to the fourth bottom wall. The fifth top surface is corresponding to the fifth bottom wall. Each of the first surface, the second bottom wall, the third bottom wall, the fourth bottom wall, and the fifth bottom wall has a first surface-roughness A. Each of the second surface, the first bottom wall, the first top surface, the second top surface, the third top surface, the fourth top surface, and the fifth top surface has a second surface-roughness B. The first surface-roughness A and the second surface-roughness B satisfy: A<B. The first surface-roughness A and the second surface-roughness B further satisfy: Ra0.02≤A≤Ra1.6, and Ra0.8≤B≤Ra12.5. The first surface of the lower plastic member is positioned facing towards the upper cover.

In a third aspect, an energy storage apparatus is provided in the present disclosure. The energy storage apparatus includes a housing, a cell assembly, and an end cover assembly. The end cover assembly includes an upper cover and a lower plastic member. The lower plastic member includes a body, an explosion-proof recessed platform, a first recessed platform, a second recessed platform, a first terminal-boss, and a second terminal-boss. The body has a first surface and a second surface positioned facing away from the first surface. The first surface is configured to be positioned at one side of the body facing towards an upper cover. The explosion-proof recessed platform is disposed at a middle part of the body in a length direction of the body and protrudes relative to the second surface. A top surface of the explosion-proof recessed platform protruding from the second surface is a first top surface. The explosion-proof recessed platform is recessed relative to the first surface. The explosion-proof recessed platform defines a gas collecting groove. A bottom wall of the gas collecting groove is a first bottom wall. The first recessed platform is disposed at one end of the body in the length direction of the body and protrudes relative to the second surface. A top surface of the first recessed platform protruding from the second surface is a second top surface. The first recessed platform is recessed relative to the first surface. The first recessed platform defines a first groove. A bottom wall of the first groove is a second bottom wall. The second recessed platform is disposed at one end of the body away from the first recessed platform in the length direction of the body, and protrudes relative to the second surface. A top surface of the second recessed platform protruding from the second surface is a third top surface. The second recessed platform is recessed relative to the first surface. The second recessed platform defines a second groove. A bottom wall of the second groove is a third bottom wall. The first terminal-boss is disposed at the body and between the explosion-proof recessed platform and the first recessed platform. The first terminal-boss protrudes relative to the first surface. A top surface of the first terminal-boss protruding from the first surface is a fourth top surface. The first terminal-boss is recessed relative to the second surface. The first terminal-boss defines a first terminal-groove. A bottom wall of the first terminal-groove is a fourth bottom wall. The second terminal-boss is disposed at the body and between the explosion-proof recessed platform and the second recessed platform. The second terminal-boss protrudes relative to the first surface. A top surface of the second terminal-boss protruding from the first surface is a fifth top surface. The second terminal-boss is recessed relative to the second surface. The second terminal-boss defines a second terminal-groove. A bottom wall of the second terminal-groove is a fifth bottom wall.

The first surface is corresponding to the second surface. The first top surface is corresponding to the first bottom wall. The second top surface is corresponding to the second bottom wall. The third top surface is corresponding to the third bottom wall. The fourth top surface is corresponding to the fourth bottom wall. The fifth top surface is corresponding to the fifth bottom wall. Each of the first surface, the second bottom wall, the third bottom wall, the fourth bottom wall, and the fifth bottom wall has a first surface-roughness A. Each of the second surface, the first bottom wall, the first top surface, the second top surface, the third top surface, the fourth top surface, and the fifth top surface has a second surface-roughness B. The first surface-roughness A and the second surface-roughness B satisfy: A<B. The first surface-roughness A and the second surface-roughness B further satisfy: Ra0.02≤A≤Ra1.6, and Ra0.8≤B≤Ra12.5. The first surface of the lower plastic member is positioned facing towards the upper cover. The cell assembly is disposed in the housing. The end cover assembly is connected to the housing.

In a fourth aspect, a power consuming device is provided in the present disclosure. The power consuming apparatus includes a power consuming apparatus and the energy storage apparatus in the third aspect. The energy storage apparatus is configured to supply power to the power consuming apparatus.

As illustrated in FIG. 1, an energy storage apparatus 1000 provided in an embodiment of the present disclosure is applied to an energy storage system. The energy storage system includes an energy storage apparatus 1000, an electric energy conversion apparatus (photovoltaic panel 2000), a wind energy conversion apparatus (wind turbine 3000), a power grid 4000, etc. The energy storage apparatus 1000 may serve as an energy storage cabinet, which may be mounted outdoors. Specifically, the photovoltaic panel 2000 can convert solar energy into electric energy during the electricity-price valley period. The energy storage apparatus 1000 is configured to store the electric energy and provide the electric energy to the power grid 4000 during a power-consumption peak period, or supply electricity when there is an outage/blackout in the power grid 4000. The wind energy conversion apparatus (wind turbine 3000) can convert wind energy into electric energy. The energy storage apparatus 1000 is configured to store the electric energy and provide the electric energy to the power grid during the power-consumption peak period, or supply electricity when there is an outage/blackout in the power grid. The electric energy may be transmitted using a high voltage cable.

There may be multiple energy storage apparatuses 1000, which are connected in series or in parallel. The multiple energy storage apparatuses 1000 are supported and electrically connected by means of a separating plate (not illustrated in the accompanying drawings). In this embodiment, the term "multiple" refers to two or more than two. An energy storage box may be disposed outside the energy storage apparatus 1000, and used to accommodate the energy storage apparatus 1000.

It may be understood that, the energy storage apparatus 1000 may include, but is not limited to a cell, a battery module, a battery pack, a battery system, etc. The actual application form of the energy storage apparatus 1000 provided in embodiments of the present disclosure may be, but is not limited to, the above-listed products, or may be other application forms. Embodiments of the present disclosure do not impose strict restrictions on the application form of the energy storage apparatus 1000.

Figure 12:
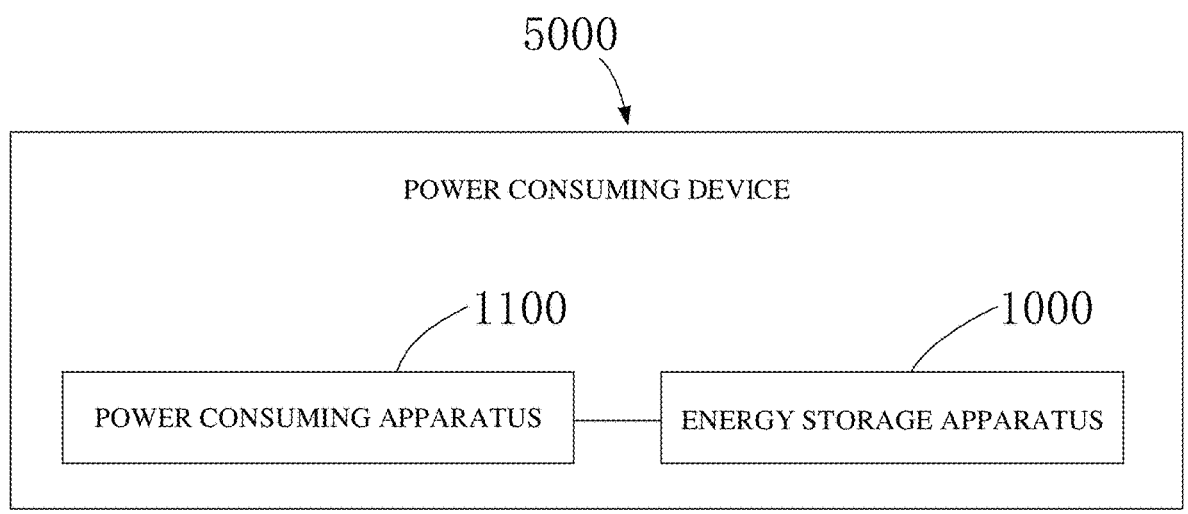
FIG. 12 is a block view of a power consuming device according to an embodiment.

As illustrated in FIG. 1 and FIG. 12, a power consuming device 5000 is provided in an embodiment of the present disclosure. The power consuming device 5000 includes a power consuming apparatus 1100 and the energy storage apparatus 1000 in embodiments of the present disclosure. The energy storage apparatus 1000 is configured to supply power to the power consuming apparatus 1100. The power consuming apparatus 1100 may be a power-generation-side power consuming apparatus, a grid-side power consuming apparatus, a base-station-side power consuming apparatus, a user-side power consuming apparatus, etc. The power consuming apparatus 1100 may specifically be various types of power consuming loads, which is not limited herein.

Figure 2:
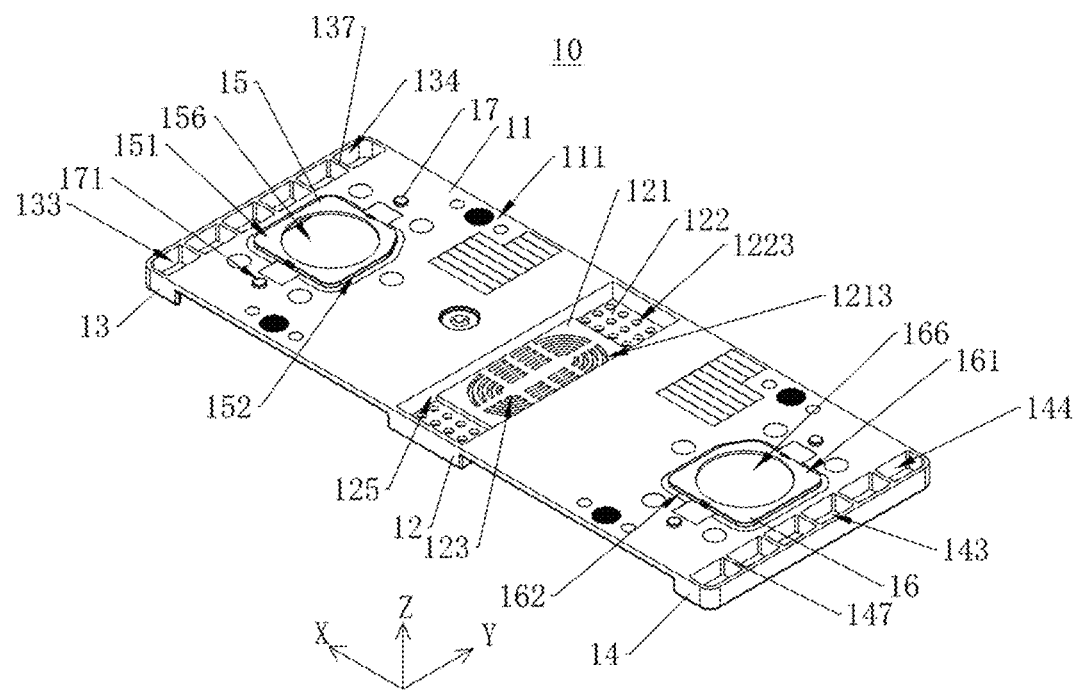
FIG. 2 is a perspective view of a lower plastic member according to an embodiment.
Figure 11:
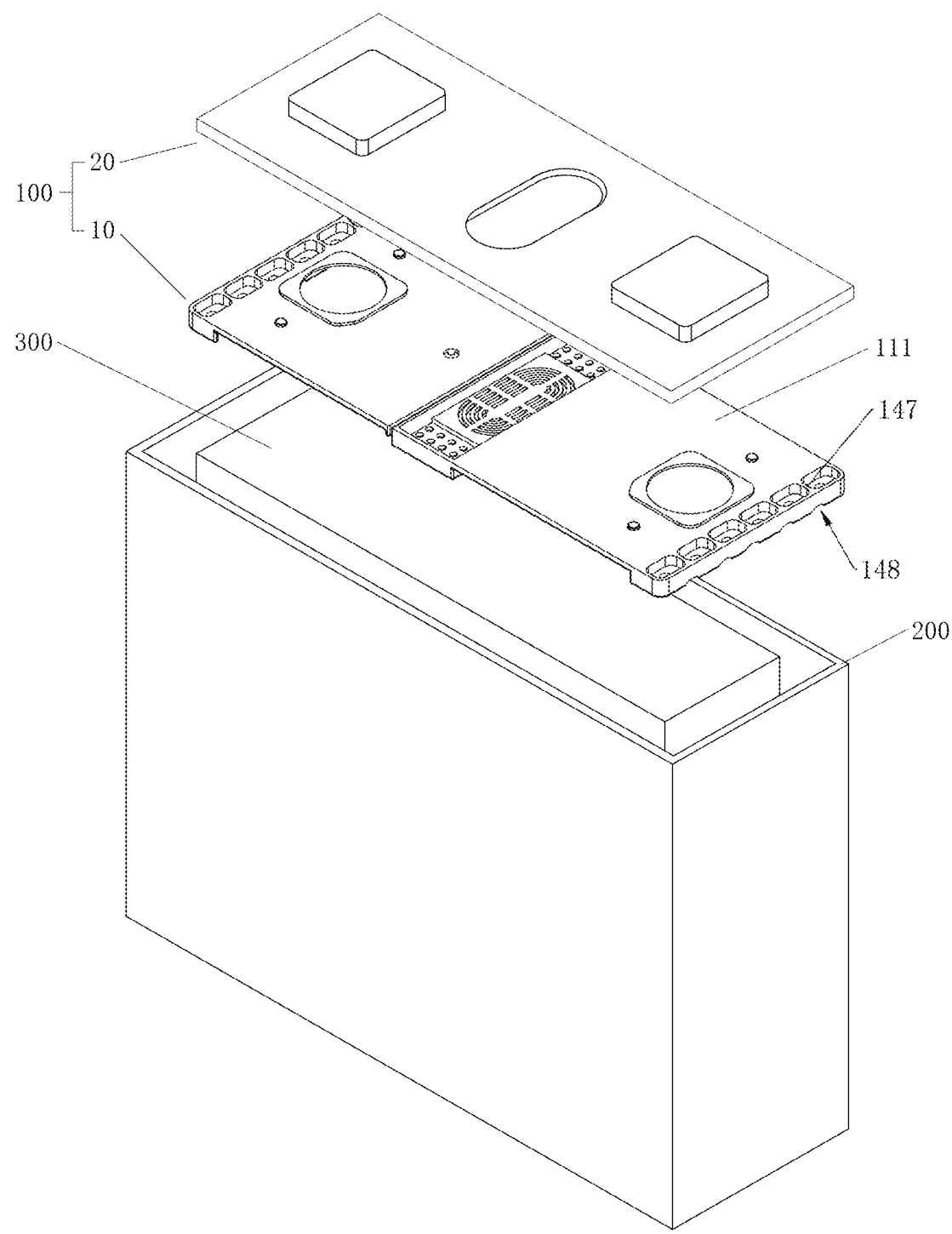
FIG. 11 is an exploded schematic view of an energy storage apparatus according to an embodiment.

As illustrated in FIG. 1, FIG. 2, and FIG. 11, an energy storage apparatus 1000 is further provided in embodiments of the present disclosure. The energy storage apparatus 1000 includes a housing 200, a cell assembly 300, and an end cover assembly 100 in any embodiment of the present disclosure. The cell assembly 300 is disposed in the housing 200 and the end cover assembly 100 is connected to the housing 200.

The housing 200 may be a square housing, and may be made of aluminum or steel, which is not limited. The housing 200 defines an accommodating space. The cell assembly 300 is accommodated in the accommodating space. The accommodating space has an opening(s) at one end or two ends of the accommodating space. The end cover assembly 100 is disposed at the opening. The end cover assembly 100 is connected and fixed to the housing 200, and close the opening. The cell assembly 300 may specifically include one or more cells connected to tab(s). The end cover assembly 100 may include an upper cover 20, a lower plastic member 10, a terminal (not shown), an explosion-proof valve (not shown), and the like. The lower plastic member 10 is disposed at one side of the upper cover facing the cell assembly 300. The terminal passes through the lower plastic member 10 and the upper cover. The terminal is insulated from the upper cover. The terminal is connected to the tab. An external power source is connected to the terminal to charge the battery cell through the tab. The electric energy of the battery cell can also be transmitted to an external power consuming load through the tab and the terminal. The explosion-proof valve is disposed on the upper cover. When a large amount of gas is generated due to abnormal heat of the cell assembly 300, the explosion-proof valve can be exploded to release the gas, so as to avoid the explosion of the energy storage apparatus.

As illustrated in FIG. 2, an end cover assembly is further provided in embodiments of the present disclosure. The end cover assembly includes an upper cover and the lower plastic member 10 in any embodiment of the present disclosure. A first surface 111 of the lower plastic member 10 faces the upper cover. The end cover assembly can be referred to above, and is not limited herein.

The lower plastic member in embodiments of the present disclosure will be introduced in detail below.

Figure 3:
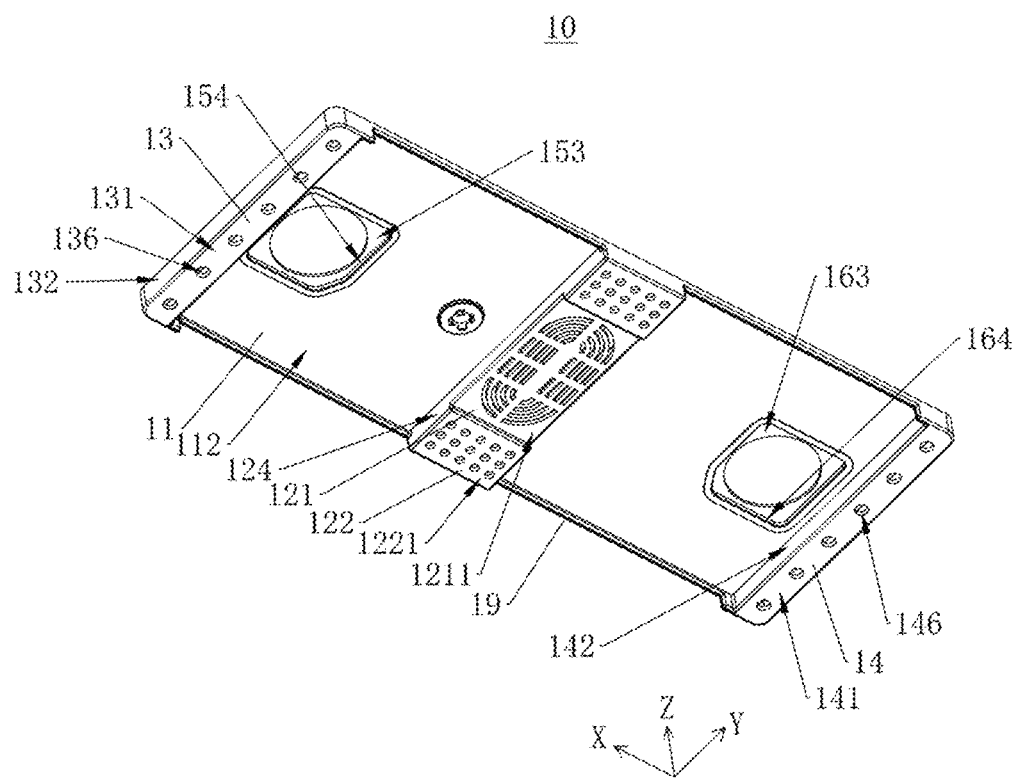
FIG. 3 is a perspective view of a lower plastic member according to an embodiment, viewed from another direction.

As illustrated in FIG. 2 and FIG. 3, the lower plastic member 10 is provided in embodiments of the present disclosure. The lower plastic member 10 is used for an end cover assembly of an energy storage apparatus 1000. The lower plastic member 10 is made by an injection molding process. Various structures of the lower plastic member 10 described below are integrated structures formed by injection molding.

The lower plastic member 10 specifically includes a body 11. The body 11 has a first surface 111 and a second surface 112 positioned facing away from the first surface 111. The first surface 111 is configured to be positioned at one side of the body 11 facing towards an upper cover. The second surface 112 is configured to be positioned at one side of the body 11 facing towards a cell assembly. The body 11 substantially has a sheet-like structure. The first surface 111 and second surface 112 are substantially flat or slightly curved, which are not limited herein. The first surface 111 and second surface 112 each are substantially rectangular.

A coordinate system is established for convenience of explanation. A first direction X is a length direction of the body 11, and is also a length direction of each of the first surface 111, the second surface 112, and the lower plastic member 10. A second direction Y is a width direction of the body 11, and is also a width direction of each of the first surface 111, the second surface 112, and the lower plastic member 10. A third direction Z is a thickness direction of the body 11, that is, a direction in which the first surface 111 and the second surface 112 that are positioned facing away from each other, and a thickness direction of the lower plastic member 10.

The first surface 111 has a first surface-roughness A. The second surface 112 has a second surface-roughness B. The first surface-roughness is A and the second surface-roughness B satisfy: A<B. That is, the first surface 111 is smoother than the second surface 112, and the second surface 112 is rougher than the first surface 111.

The lower plastic member 10 is mounted to form the end cover assembly. After the end cover assembly is mounted to form the energy storage apparatus 1000, the first surface 111 is substantially at one side of the lower plastic member 10 positioned facing away from the center of earth, and the second surface 112 is substantially at one side of the lower plastic member 10 positioned facing towards the center of earth. The upper cover is disposed above the lower plastic member 10 (that is, one side facing away from the center of earth), and the cell assembly is disposed below the lower plastic member 10 (that is, one side facing towards the center of earth). The cell assembly is impregnated with an electrolyte. During operation or transportation of the energy storage apparatus 1000, the electrolyte infiltrating the cell assembly may be splashed to the first surface 111 of the lower plastic member 10 and the second surface 112 of the lower plastic member 10 due to vibration, shaking, and other reasons. If there is no special design for the lower plastic member 10, the electrolyte may remain on the lower plastic member 10 and not return to the cell assembly. As a result, the electrolyte in the cell assembly is reduced, the utilization rate of the electrolyte is reduced, and the service life of the energy storage apparatus 1000 is possibly shortened.

In embodiments of the present disclosure, the lower plastic member 10 is specially designed. Specifically, the first surface-roughness and the second surface-roughness of the first surface 111 of the body 11 are set to satisfy A<B, so that the first surface 111 is smoother than the second surface 112. Droplets of the electrolyte on the first surface 111 spread flat under the gravity and surface tension, and flow back to the cell assembly along an edge of the body 11, so as to provide an ion channel for a positive electrode and a negative electrode in the cell assembly. The second surface 112 is rougher than the first surface 111. Therefore, under the influence of gravity, surface tension, and the relatively rough second surface 112, droplets of the electrolyte on the second surface 112 will adhere to and wrap on microscopic protrusions of the second surface 112, gather in granular shapes macroscopically, and form hanging hemispheres, which can fall back to the cell assembly with a slight vibration to provide an ion channel for the positive electrode and the negative electrode.

Therefore, in the lower plastic member 10 provided in embodiments of the present disclosure, by setting the first surface-roughness of the first surface 111 and the second surface-roughness of the second surface 112 to satisfy A<B, after the lower plastic member 10 is mounted to the energy storage apparatus 1000, the electrolyte splashed on the relatively flat and smooth first surface 111 can spread flat and then flow back to the cell assembly along the edge of the first surface 111, and droplets of the electrolyte splashed on the rough second surface 112 can form hanging hemispheres and can fall back to the cell assembly with a slight vibration. Therefore, the electrolyte splashed on the lower plastic member 10 can return to the cell assembly to construct an ion channel between the positive electrode and the negative electrode, the electrolyte is prevented from remaining on the lower plastic member 10 and does not participate in the electrochemical reaction of the cell assembly, the utilization rate of the electrolyte is improved, and thus the service life of the energy storage apparatus 1000 is prolonged.

Optionally, the first surface-roughness and the second surface-roughness further satisfy: Ra0.02≤A≤Ra1.6, and Ra0.8≤B≤Ra12.5. The first surface-roughness of the first surface 111 of the body 11 is set to satisfy: Ra0.02≤A≤Ra1.6, so that the first surface 111 is relatively flat and smooth. Droplets of the electrolyte on the first surface 111 spread flat under the gravity and surface tension, and flow back to the battery pack along the edge of the body 11, so as to provide the ion channel for the positive electrode and the negative electrode in the cell assembly. In addition, the second surface-roughness of the second surface 112 is set to satisfy: Ra0.8≤B≤Ra12.5, so that the second surface 112 is relatively rough. Therefore, under the influence of gravity, surface tension, and the relatively rough second surface 112, the droplets of the electrolyte on the second surface 112 will adhere to and wrap on the microscopic protrusions of the second surface 112, gather in granular shapes macroscopically, and form the hanging hemispheres, which can fall back to the cell assembly with a slight vibration to provide the ion channel for the positive electrode and the negative electrode. It can be seen that in the present disclosure, the surface roughness can be regarded as the quality of a surface of not being smooth. In addition, the surface roughness is a component of surface finish (surface texture). In an embodiment of the present disclosure, the surface roughness refers to arithmetical mean roughness, represented by Ra, which means the value obtained by the following formula and expressed in micrometer (μm) when sampling only the reference length Q from the roughness curve in the direction of the mean line, taking X-axis in the direction of mean line and Y-axis in the direction of longitudinal magnification of this sampled part and the roughness curve is expressed by y=f(x): surface roughness $$= \frac{1}{Q} \int_0^Q \{f(x)\} dx.$$

For example, when the surface roughness is expressed as Ra0.1, it means that the value of the surface roughness is 0.1 μm.

The first surface-roughness may specifically be any one of Ra0.02, Ra0.05, Ra0.1, Ra0.15, Ra0.2, Ra0.25, Ra0.3, Ra0.35, Ra0.4, Ra0.45, Ra0.5, Ra0.55, Ra0.6, Ra0.65, Ra0.7, Ra0.75, Ra0.8, Ra0.85, Ra0.9, Ra0.95, Ra1, Ra1.05, Ra1.15, Ra1.2, Ra1.25, Ra1.3, Ra1.35, Ra1.4, Ra1.45, Ra1.5, Ra1.55, Ra1.6, etc., or may be other values, which is not limited specifically.

The second surface-roughness may specifically be Ra0.8, Ra1, Ra1.5, Ra2, Ra2.5, Ra3, Ra3.5, Ra4, Ra4.5, Ra5, Ra5.5, Ra6, Ra6.5, Ra7, Ra7.5, Ra8, Ra8.5, Ra9, Ra9.5, Ra10, Ra10.5, Ra11, Ra11.5, Ra12, Ra12.5, etc., or may be other values, which is not limited specifically.

When the first surface-roughness of the first surface satisfies: Ra0.025≤A≤Ra1.6, the manufacturing process of the first surface 111 is less difficult, easy to realize and lower in cost, and the first surface 111 is relatively flat and smooth, so that the electrolyte on the first surface 111 can smoothly flow back to the cell assembly from the edge. If A<Ra0.02, the manufacturing process is more difficult, difficult to machine and higher in cost. If A>Ra1.6, the first surface 111 is less smooth, so that it is difficult for the electrolyte to spread flat on the first surface 111 and then flow to the edge, and more electrolyte may remain on the first surface 111, resulting in a decrease in the utilization rate of the electrolyte.

When the second surface-roughness satisfies: Ra0.8≤B≤Ra12.5, the second surface 112 is relatively rough, so that the droplets of the electrolyte can form in a hanging shape and fall to the cell assembly with a slight vibration. If B<Ra0.8, the second surface 112 is relatively smooth, so that it is easy for the electrolyte to form in a flat sheet-shape, but it is difficult for the electrolyte to form droplets that wrap the microscopic protrusions and hang. If B>Ra12.5, the second surface 112 is too rough, the size of the microscopic protrusion is large, and the area of the outer surface of the microscopic protrusion is large, so that the electrolyte will adhere to the outer surface of the microscopic protrusion but will not hang, and the electrolyte will fall off only after a large vibration. However, the large vibration may damage the energy storage apparatus 1000, which is not conducive to improving the service life of the energy storage apparatus 1000.

Optionally, the first surface-roughness may further satisfy: Ra0.05<A>Ra1.2. Therefore, the process difficulty is further reduced, and the electrolyte on the first surface 111 can more easily flow back to the cell assembly from the edge.

Optionally, the second surface-roughness may further satisfy: Ra2≤B≤Ra10. Therefore, the droplet of the electrolyte can more easily wrap the microscopic protrusion and form in the hanging shape, so as to more easily fall to the cell assembly with a little vibration.

In an embodiment, as illustrated in FIG. 2 and FIG. 3, the lower plastic member 10 further includes an explosion-proof recessed platform 12, a first recessed platform 13, and a second recessed platform 14. The explosion-proof recessed platform 12 is disposed at a middle part of the body 11 in a length direction of the body 11. The first recessed platform 13 and the second recessed platform 14 are respectively disposed at two ends of the body 11 in the length direction of the body 11. The explosion-proof recessed platform 12, the first recessed platform 13, and the second recessed platform 14 are all recessed relative to the first surface 111 and protruding relative to the second surface 112.

The explosion-proof recessed platform 12, the first recessed platform 13, and the second recessed platform 14 are all injection-molded integrated with the body 11, and other structures on the lower plastic member 10 in the following are also integrated structures formed by injection molding, which will not be described in detail in the following.

The explosion-proof recessed platform 12 extends in the width direction of the body 11, that is, a length direction of the explosion-proof recessed platform 12 is the width direction of the body 11. The explosion-proof recessed platform 12 is recessed relative to the first surface 111, so that the explosion-proof recessed platform 12 defines a gas collecting groove 123. An opening of the gas collecting groove 123 is located at the first surface 111. A bottom wall of the gas collecting groove 123 defines a vent hole, and the vent hole extends through the explosion-proof recessed platform 12, so that the space at one side of the body 11 corresponding to the second surface 112 is in communication with the gas collecting groove 123 through the vent hole. After the lower plastic member 10 is mounted to the energy storage apparatus 1000, the gas generated by the cell assembly can flow to the gas collecting groove 123 through the vent hole, and an explosion-proof valve is disposed on a part of the upper cover corresponding to the gas collecting groove 123. When the gas pressure is greater than the preset value, the explosion-proof valve will be exploded to release the gas, so as to avoid the explosion caused by excessive gas pressure inside the energy storage apparatus 1000. The specific structures of the explosion-proof recessed platform 12, the gas collecting groove 123, and the vent hole may not be limited.

Each of the first recessed platform 13 and the second recessed platform 14 extends in the width direction of the body 11, that is, the length direction of each of the first recessed platform 13 and the second recessed platform 14 is the width direction of the body 11. Each of the first recessed platform 13 and the second recessed platform 14 is recessed relative to the first surface 111, so that the first recessed platform 13 defines a first groove 133, and the second recessed platform 14 defines a second groove 143. An opening of the first groove 133 and an opening of the second groove 143 are located at the first surface 111. The bottom wall of the first groove 133 defines a first leakage hole 136. The first leakage hole 136 extends through the first recesses boss 13. The bottom wall of the second groove 143 defines a second leakage hole 146. The second leakage hole 146 extends through the second recessed platform 14. After the lower plastic member 10 is mounted to the energy storage apparatus 1000, the electrolyte on the first surface 111 can flow into the first groove 133, and then leak into the cell assembly through the first leakage hole 136, and the electrolyte on the first surface 111 can flow into the second groove 143, and then leak into the cell assembly through the second leakage hole 146. The specific structures of the first recessed platform 13, the second recessed form 14, the first groove 133, the second groove 143, the first leakage hole 136, and the second leakage hole 146 may not be limited.

The explosion-proof recessed platform 12, the first recessed platform 13, and the second recessed platform 14 may protrude from the second surface 112 by the same height. After the lower plastic member 10 is mounted to the energy storage apparatus 1000, the explosion-proof recessed platform 12, the first boss 121, and the second boss 122 can be in contact with the cell assembly, so that there is a gap between the body 11 and the cell assembly to define an accommodating space. The accommodating space can be used for arrangement of other devices of the energy storage apparatus 1000, such as tabs and connecting pieces, and the gas of the cell assembly can also flow in the accommodating space, and then enter the gas collecting groove 123.

The lower plastic member 10 further includes a first terminal-boss 15 and a second terminal-boss 16. The first terminal-boss 15 and the second terminal-boss 16 are disposed on the body 11 at intervals, and both protrude relative to the first surface 111 and are recessed relative to the second surface 112, so that the first terminal-boss 15 defines a first terminal-groove 153, and the second terminal-boss 16 defines a second terminal-groove 163. An opening of the first terminal-groove 153 and an opening of the second terminal-groove 163 are located at the second surface 112. The first terminal-boss 15 is disposed between the first recessed platform 13 and the explosion-proof recessed platform 12. The second terminal-boss 16 is disposed between the second recessed platform 14 and the explosion-proof recessed platform 12. The first terminal-boss 15 defines a first terminal-hole 156. The second terminal-boss 16 defines a second terminal-hole 166. When the lower plastic member 10 is mounted to the end cover assembly, the first electrode of the end cover assembly passes through the first terminal-hole 156, and the second electrode of the end cover assembly passes through the second terminal-hole 166. The first electrode includes a first disc and a first column. The second electrode includes a second disc and a second column. The first disc is accommodated in the first terminal-groove 153. The first column passes through the first terminal-hole 156. The second disc is accommodated in the second terminal-groove 163. The second column passes through the second terminal-hole 166. Specific structures of the first terminal-boss 15, the second terminal-boss 16, the first terminal-hole 156, the second terminal-hole 166, the first terminal-groove 153, the second terminal-groove 163, the first electrode, and the second electrode may not be limited.

The lower plastic member 10 further includes an anti-rotation post 17. The anti-rotation post 17 is connected to the body 11 and protrudes from the first surface 111. The anti-rotation post 17 is configured to extend into a limiting groove on the upper cover to position the installation between the lower plastic member 10 and the upper cover, and to limit the displacement of the upper cover and the lower plastic member 10 in both the length direction of the body and width direction of the body 11. There may be multiple anti-rotation posts 17 arranged at intervals. For example, as illustrated in FIG. 2, there are four anti-rotation posts 17, two of which are disposed at two sides of the first terminal-boss 15 in the width direction of the body 11, and the other two of which are disposed at two sides of the second terminal-boss 16 in the width direction of the body 11. Multiple anti-rotation posts 17 are provided to improve the positioning and limiting effects.

Figure 4:
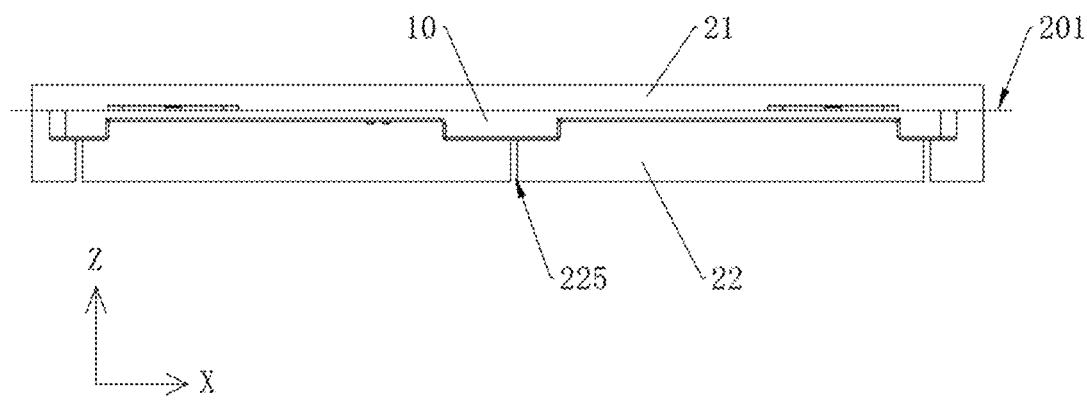
FIG. 4 is a schematic view of injection molding of a lower plastic member according to an embodiment.
Figure 5:
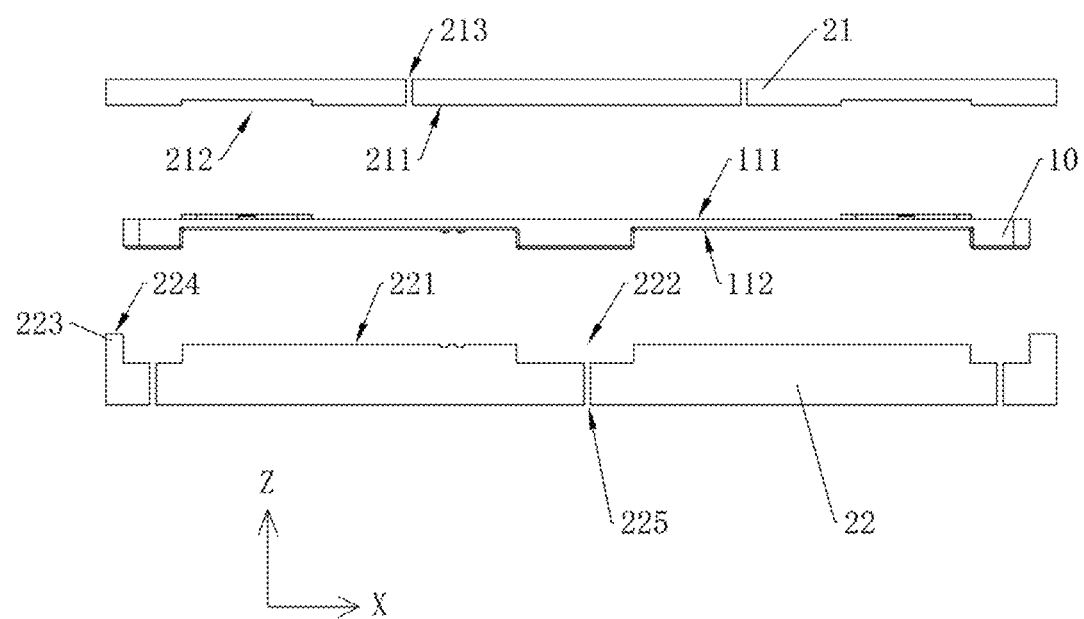
FIG. 5 is an explosion view of injection molding of a lower plastic member according to an embodiment.

As illustrated in FIG. 4 and FIG. 5, the lower plastic member 10 is formed by injection molding after the first mold 21 (fixed mold) and the second mold 22 (movable mold) are closed, and a plane where the first mold 21 and the second mold 22 are butted against each other is a mold-mating plane 201. The mold-mating plane 201 is shown by a dotted line in FIG. 4. In embodiments of the present disclosure, the first mold 21 and the second mold 22 are butted in the third direction Z (i.e., the thickness direction of the lower plastic member 10), and the mold-mating plane 201 coincides with the first surface 111. After injection molding is completed, a demolding direction is also the third direction Z.

The first mold 21 has a first molding surface 211. The first molding surface 211 is flat and extends to an edge of the first mold 21. The first mold 21 may define a recessed first molding groove 212 on the first molding surface 211. The first molding groove 212 is corresponding to a structure of the lower plastic member 10 protruding from the first surface 111. According to the quantity and different shapes of the structures of the lower plastic member 10 protruding from the first surface 111, the quantity and shape of the first molding grooves 212 can be designed adaptively, which are not specifically limited.

The second mold 22 has a second molding surface 221. The second molding surface 221 is flat, and is at a certain distance from an edge of the first mold 21 in a middle region of the first mold 21. The second mold 22 may define a recessed second molding groove 222 on the second molding surface 221. The second molding groove 222 is corresponding to a structure of the lower plastic member 10 protruding from the second surface 112. According to the quantity and different shapes of the structures of the lower plastic member 10 protruding from the second surface 112, the quantity and shape of the second molding grooves 222 can be designed adaptively, which are not specifically limited.

A butting portion 223 protruding from the second molding surface 221 is further positioned at a peripheral edge of the second mold 22. The second molding surface 221 can extend to and be connected to a side surface of the butting portion 223. A top surface of the butting portion 223 protruding from the first surface 111 is a butting surface 224. The butting surface 224 is configured to be in close contact with the first molding surface 211 of the first mold 21.

During injection molding, the first mold 21 and the second mold 22 are butted, so that the butting surface 224 is in close contact with the first molding surface 211. At this time, there is a gap between the first molding surface 211 and the second molding surface 221 to define a cavity. The first molding groove 212 and the second molding groove 222 both are in communication with the cavity to jointly form a mold cavity. Molten plastic liquid is poured into the mold cavity, and is cooled after the mold cavity is filled with the molten plastic liquid, and the lower plastic member 10 can be formed after the plastic liquid is cooled and solidified. The first molding surface 211 is configured to form the first surface 111 of the lower plastic member 10. The second molding surface 221 is configured to form the second surface 112 of the lower plastic member 10. The first molding groove 212 is configured to form the structure of the lower plastic member 10 protruding from the first surface 111. The second molding groove 222 is configured to form the structure of the lower plastic member 10 protruding from the second surface 112.

During demolding, the second mold 22 is moved away from the first mold 21 to separate the second mold 22 from the lower plastic member 10, and then the lower plastic member 10 is pushed away from the first mold 21 by a push rod (not shown) to separate the lower plastic member 10 from the first mold 21.

In embodiments of the present disclosure, during injection molding, it is not necessary to wait for the plastic liquid to cool to room temperature before demolding, but rather, it is only necessary for the plastic liquid to solidify and mold and to be demolded at a higher temperature, so that the production efficiency can be improved. However, the plastic that is not completely cooled to room temperature may leave some marks to form specific shapes when the plastic is subjected to external force. As illustrated in FIG. 2, some specific shapes are formed on the first surface 111, which are not specifically limited. Thanks to the optimization of injection molding process, these marks do not affect the functional realization of the lower plastic member 10, and the production efficiency can be significantly improved.

In embodiments of the present disclosure, the first surface-roughness of the first surface 111 is formed by the first molding surface 211 of the first mold 21. The second surface-roughness of the second surface 112 is formed by the second molding surface 221 of the second mold 22. The first molding surface 211 and the second molding surface 221 can be manufactured by specific machining processes, such as milling, grinding, polishing, etc., by a milling cuter, to obtain the required surface-roughness characteristics, which is not specifically limited.

As illustrated in FIG. 4 and FIG. 5, the first mold 21 defines a pushing hole 213 extending through the first mold 21 in the thickness direction (i.e., the third direction Z) of the lower plastic member 10. During injection molding, the pushing hole 213 can be blocked by a plunger and other structures to prevent plastic liquid from entering the pushing hole 213. When injection molding is completed, the plunger is pulled out and the push rod (e.g., an ejector pin) is inserted into the pushing hole 213 to push the lower plastic member 10 away from the first mold 21. The pressure of the push rod acting on the lower plastic member 10 will leave marks on the lower plastic member 10 after the action of the push rod. As illustrated in FIG. 2, some circular pushing point parts formed on the first surface 111 are residual marks after the injection molding, and are obtained by adopting a higher temperature demolding process.

As illustrated in FIG. 4 and FIG. 5, the second mold 22 defines a pouring hole 225 extending through the second mold 22 in the third direction Z. The pouring hole 225 is in communication with the mold cavity. The pouring hole 225 allows the plastic liquid to flow, so that the plastic liquid can be injected into the mold cavity. After the plastic liquid is solidified and molded, demolding is performed. After demolding, a pouring mark may remain at a position of the lower plastic member 10 corresponding to the pouring hole 225 to form a gate portion. The gate portion may be a protrusion, a groove, or other structures, which is not limited. The shape and size of the gate portion are also not limited.

In embodiments of the present disclosure, a gate portion is formed on the second surface 112 positioned facing away from the first surface 111. The gate portion may be located on at least one of the second surface 112, the explosion-proof recessed platform 12, the first recessed platform 13, and the second recessed platform 14. Therefore, the first mold 21 is configured for demolding by the push rod, and the second mold 22 is configured for pouring of the plastic liquid, so that the function of the first mold is independent from the function of the second mold. Therefore, misoperation, which is easily caused by performing the pouring of the plastic liquid and the demolding by the push rod on the same mold at the same time, can be avoided, and then adverse effects caused by the misoperation can be avoided.

During separation of the second mold 22 from the lower plastic member 10, the lower plastic member 10 may be pulled by the second mold 22 to a certain extent, so that the lower plastic member 10 to be separated from the first mold 21, and further the lower plastic member 10 may be locally deformed and damaged, resulting in low product yield.

In embodiments of the present disclosure, the second surface-roughness of the second surface 112 is set to satisfy: A<B, so that the second surface 112 is rougher than the first surface 111. When the second mold 22 is demolded, gas can enter the space between the lower plastic member 10 and the second mold 22 through the microscopic gap between the rougher second surface 112 and the second mold 22, so as to avoid local negative pressure generated between the second surface 112 and the second mold 22, resulting in a large adsorption force and difficulty in demolding. Therefore, the second mold 22 is easier to be separated from the lower plastic member 10 than the first mold 21. In other words, when the second mold 22 is separated from the lower plastic member 10, the first mold 21 still tightly absorbs the lower plastic member 10. Therefore, the deformation and damage of the lower plastic member 10, caused by the second mold 22 pulling out the local structure of the lower plastic member 10, can be avoided, so that the product yield can be improved.

In the present disclosure, the first mold 21 is demolded by using the push rod to act on the lower plastic member 10. The push rods can be uniformly arranged on the lower plastic member 10, so that the lower plastic member 10 is uniformly stressed, and the bending caused by unbalanced local stress on the lower plastic member 10 is avoided. Therefore, the first surface 111 is relatively small first surface-roughness, and is relatively flat and smooth, so that bending and deformation of the lower plastic member 10 during demolding will not occur.

Figure 7:
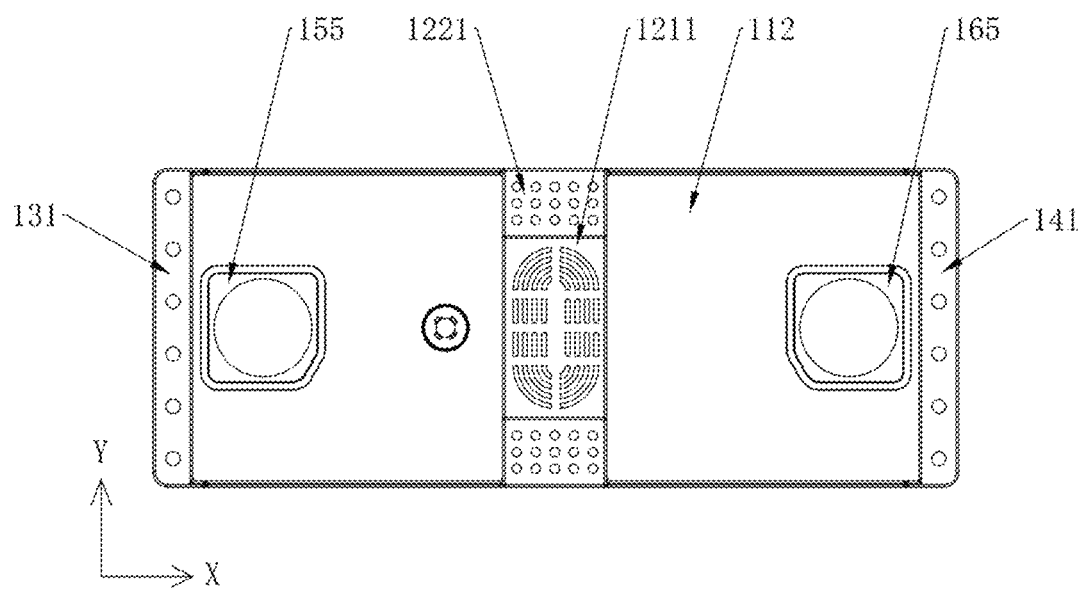
FIG. 7 is a bottom view of a lower plastic member according to an embodiment.

In an embodiment, as illustrated in FIG. 3 and FIG. 7, a top surface of the explosion-proof recessed platform 12 protruding from the second surface 112 is a first top surface. A top surface of the first recessed platform 13 protruding from the second surface 112 is a second top surface 131. A top surface of the second recessed platform 14 protruding from the second surface 112 is a third top surface 141. Each of the first top surface, the second top surface 131, and the third top surface 141 has a second surface-roughness.

Similar to the second surface-roughness of the second surface 112, each of the first top surface, the second top surface 131, and the third top surface 141 in this embodiment is set to have the second surface-roughness, so that the droplet of the electrolyte can be in a hanging shape, and can fall back to the cell assembly with a slight vibration, to provide the ion channel for the positive electrode and the negative electrode. In addition, it is easy for the lower plastic member 10 to be separated from the second mold 22 during demolding, so as to avoid local deformation and damage of the lower plastic member 10 and improve the product yield.

In an embodiment, as illustrated in FIG. 2, FIG. 3, and FIG. 7, the explosion-proof recessed platform 12 includes a first boss 121 and two second bosses 122. The first boss 121 is disposed at the middle part of the body 11 in the width direction of the body 11. Two ends of the first boss 121 in the width direction of the body 11 are connected to the two second bosses, respectively. The height of the first boss 121 protruding relative to the second surface 112 is less than the height of the second boss 122 protruding relative to the second surface 112. The first top surface includes a first top sub-surface 1211 and two second top sub-surfaces 1221. A top surface of the first boss 121 protruding from the second surface 112 is the first top sub-surface 1211. Top surfaces of the two second bosses 122 protruding from the second surface 112 are the two second top sub-surfaces 1221. Each of the first top sub-surface 1211 and the two second top sub-surfaces 1221 has the second surface-roughness.

The vent hole includes a first vent hole 1213 and a second vent hole 1223. The first boss 121 defines the first vent hole 1213 therethrough. The second boss 122 defines the second vent hole 1223 therethrough. The space at one side of the body 11 corresponding to the second surface 112 is in communication with the gas collecting groove 123 through each of the first vent hole 1213 and the second vent hole 1223. The shapes and structures of the first vent hole 1213 and the second vent hole 1223 are not limited. Optionally, the first vent hole 1213 may be a strip-shaped hole, and there may be multiple first vent holes. The multiple strip-shaped holes substantially form an annular structure with one ring linked with another, so that a fence is formed at the first boss 121, and plays a role in preventing foreign matters from moving from the cell assembly to the upper cover. Optionally, the second vent hole 1223 may be a circular hole, and there may be multiple second vent holes 1223 arranged at equal intervals.

By setting the height of the first boss 121 protruding relative to the second surface 112 to be less than the height of the second boss 122 protruding relative to the second surface 112, when the second boss 122 is in contact with the cell assembly, there is still a certain gap between the first boss 121 and the cell assembly, so that gas can flow between the left and right sides of the explosion-proof recessed platform 12 (that is, the two sides of the explosion-proof recessed platform in the length direction of the body 11) through the gap between the first boss 121 and the cell assembly, so as to avoid the abnormality caused by local gas accumulation. In addition, some devices can also be arranged in the gap to maximize the use of space and facilitate the miniaturization of the energy storage apparatus 1000.

By setting the first top sub-surface 1211 and the second top sub-surface 1221 to have the second surface-roughness, the droplet of the electrolyte can be in a hanging shape, and can fall back to the cell assembly with a slight vibration, to provide the ion channel for the positive electrode and the negative electrode. Moreover, it is easy for the lower plastic member to be separated from the mold during demolding, so that the lower plastic member is prevented from being locally deformed and damaged, thereby improving the product yield.

Figure 6:
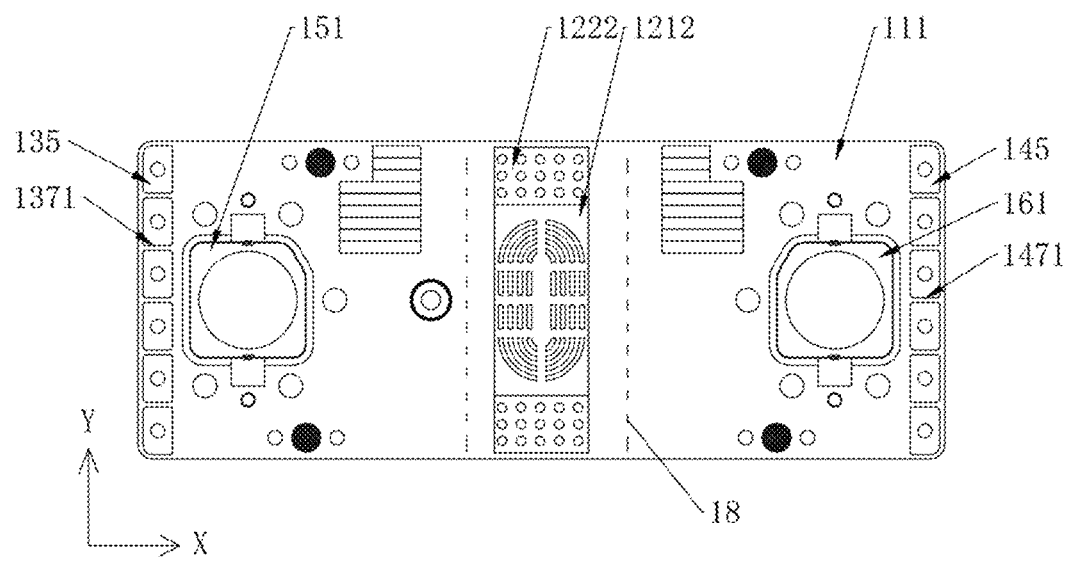
FIG. 6 is a top view of a lower plastic member according to an embodiment.

In an embodiment, as illustrated in FIG. 2 and FIG. 6, a bottom wall of the gas collecting groove 123 is a first bottom wall. The first bottom wall includes a first bottom sub-wall 1212 and two second bottom sub-walls 1222. The depth of the first boss 121 recessed relative to the first surface 111 is less than the depth of the second boss 122 recessed relative to the first surface 111. Part of the bottom wall of the gas collecting groove 123 corresponding to the first boss 121 is the first bottom sub-wall 1212. Parts of the bottom wall of the gas collecting groove 123 corresponding to the two second bosses 122 are the two second bottom sub-walls 1222. Each of the first bottom sub-wall 1212 and the two second bottom sub-walls 1222 has the second surface-roughness.

A distance between the first bottom sub-wall 1212 and the first surface 111 is less than a distance between each second bottom sub-wall 1222 and the first surface 111, and the height of the first top sub-surface 12111 relative to the second surface 112 is less than the height of the second top sub-surface 1221 relative to the second surface 112, so that the wall thickness of the bottom wall of the first boss 121 and the wall thickness of the bottom wall of the second boss 122 can be approximately uniform, and the situation that the wall thickness is locally too thick or locally too thin can be avoided, thereby ensuring the structural strength.

As illustrated in conjunction with FIG. 4 and FIG. 5, during injection molding, the first bottom sub-wall 1212 and the second bottom sub-wall 1222 are formed by the first mold 21. The explosion-proof recessed platform 12 has a relatively complex structure, specifically, it has the first boss 121, the second boss 122, the first vent hole 1213, the second vent hole 1223, and other structures. In order to facilitate demolding, each of the first bottom sub-wall 1212 and the second bottom sub-wall 1222 are also set to have the second surface-roughness. The rougher surface is more conducive to demolding. For specific principles, please refer to the above description that the second surface-roughness of the second surface 112 is conducive to demolding, which is not repeated here. Therefore, it is easier to demold, and deformation and damage of the lower plastic member 10 at the first boss 121 and the second boss 122 caused by the difficulty in demolding the first boss 121 and the second boss 122 from the first mold 21 can be avoided.

Optionally, as illustrated in FIG. 3, the explosion-proof recessed platform 12 has a first outer side-surface 124. The first recessed platform 13 has a second outer side-surface 132. The second recessed platform 14 has a third outer side-surface 142. The first outer side-surface 124 is connected to the second surface 112 and the first top surface. The second outer side-surface 132 is connected to the second surface 112 and the second top surface 131. The third outer side-surface 142 is connected to the second surface 112 and the third top surface 141. Each of the first outer side-surface 124, the second outer side-surface 132, and the third outer side-surface 142 have the first surface-roughness.

The first outer side-surface 124 is a peripheral side-surface connected to the second surface 112 and the first top surface. The second outer side-surface 132 is a peripheral side-surface connected to the second surface 112 and the second top surface 131. The third outer side-surface 142 is a peripheral side-surface connected to the second surface 112 and the third top surface 141. Each peripheral side-surface extends in the third direction Z.

As illustrated in conjunction with FIG. 4 and FIG. 5, during injection molding, multiple second molding grooves 222 of the second mold 22 are configured to form the explosion-proof recessed platform 12, the first recessed platform 13, and the second recessed platform 14. During demolding, a sidewall of the second molding groove 222 (that is, an inner wall surface extending in the third direction Z), and each of an outer side-surface of the explosion-proof recessed platform 12, an outer side-surface of the first recessed platform 13, and an outer side-surface of the second recessed platform 14 (that is, outer side-surfaces extending in the third direction Z) will rub against each other.

By setting the first outer side-surface 124, the second outer side-surface 132, and the third outer side-surface 142 each to have the first surface-roughness, the first outer side-surface 124, the second outer side-surface 132, and the third outer side-surface 142 are relatively flat and smooth, so that the friction force between the second mold 22 and each of the first outer side-surface 124, the second outer side-surface 132, and the third outer side-surface 142 can be reduced. Therefore, it is conducive to demolding, the deformation of the lower plastic member 10 caused by the pulling of the second mold 22 can be avoided, and thus the product yield is prevented from being reduced.

Optionally, as illustrated in FIG. 2 and FIG. 6, a sidewall of the gas collecting groove 123 is a first inner sidewall 125. A sidewall of the first groove 133 is a second inner sidewall 134. A sidewall of the second groove 143 is a third inner sidewall 144. Each of the first inner sidewall 125, the second inner sidewall 134, and the third inner sidewall 144 is connected to the first surface 111, and has the first surface-roughness.

The first inner sidewall 125 is a peripheral sidewall of the gas collecting groove 123. The first inner sidewall 125 is connected to the first surface 111 and the first bottom wall. The first inner sidewall 125, the second inner sidewall 134, and the third inner sidewall 144 all extend in the third direction Z.

As illustrated in conjunction with FIG. 4 and FIG. 5, during injection molding, multiple protrusions on the first molding surface 211 of the first mold 21 are configured to form the gas collecting groove 123, the first recessed groove 133, and the second recessed groove 143. During demolding, an outer surface of the protrusion of the first mold 21 (that is, an outer surface extending in the third direction Z), and each of the first inner sidewall 125, the second inner sidewall 134, and the third inner sidewall 144 will rub against each other.

By setting the first inner sidewall 125, the second inner sidewall 134, and the third inner sidewall 144 each to have the first surface-roughness, the first inner sidewall 125, the second inner sidewall 134, and the third inner sidewall 144 are relatively flat and smooth, so that the friction force between the first mold 21 and each of the first inner sidewall 125, the second inner sidewall 134 and the third inner sidewall 144 can be reduced.

Optionally, as illustrated in FIG. 2 and FIG. 6, a bottom wall of the first groove 133 is a second bottom wall 135. A bottom wall of the second groove 143 is a third bottom wall 145. Each of the second bottom wall 135 and the third bottom wall 145 has the first surface-roughness.

According to the foregoing description, the electrolyte on the first surface 111 will flow into the first groove 133 and the second groove 143 after spreading flat. By setting the second bottom wall 135 and the third bottom wall 145 each to have the first surface-roughness, the second bottom wall 135 and the third bottom wall 145 are relatively flat and smooth. Therefore, the electrolyte flowing to the second bottom wall 135 and the third bottom wall 145, like the electrolyte on the first surface 111, is also prone to spreading flat and leaking down through the first leakage hole 136 and the second leakage hole 146 to the first surface 111.

Since the structure of the first recessed platform 13 and the structure of the second recessed platform 14 are simpler than the structure of the explosion-proof recessed platform 12, the demolding can be realized by using the push rod to push the second bottom wall 135 and the third bottom wall 145, so that it is not necessary to set the second bottom wall 135 and the third bottom wall 145 to have the second surface-roughness as required for the explosion-proof recessed platform 12.

Optionally, as illustrated in FIG. 2 and FIG. 6, the lower plastic member 10 further includes multiple first reinforcing ribs 137 and multiple second reinforcing ribs 147. The multiple first reinforcing ribs 137 all extend in the length direction of the body 11 and are arranged at intervals in the width direction of the body 11. The multiple second reinforcing ribs 147 all extend in the length direction of the body 11 and are arranged at intervals in the width direction of the body 11. Each of the multiple first reinforcing ribs 137 is connected to two opposite sidewalls of the first groove 133 in the length direction of the body 11 and the bottom wall of the first groove 133. Each of the multiple second reinforcing ribs 147 is connected to two opposite sidewalls of the second groove 143 in the length direction of the body 11 and the bottom wall of the second groove 143.

The first groove 133 is divided by the multiple first reinforcing ribs 137 into multiple sub-recesses. The aforementioned second inner sidewall 134 can be a sidewall of each of the multiple sub-recesses. A bottom wall of each sub-recess (that is, the aforementioned second bottom wall 135) defines a first liquid leakage hole 136. The second groove 143 is divided by the multiple second reinforcing ribs 147 into multiple sub-recesses. The aforementioned third inner sidewall 144 can be a sidewall of each of the multiple sub-recesses. A bottom wall of each sub-recesses (that is, the aforementioned third bottom wall 145) defines a second liquid leakage hole 146.

The first reinforcing ribs 137 and the second reinforcing ribs 147 can strengthen the structural strength of the first recessed platform 13 and the second recessed platform 14 in the first direction X. When the lower plastic member 10 is mounted to the energy storage apparatus 1000, the cell assembly is first wrapped with a protective film, and then the protective film is fused to a side surface of the first recessed platform 13 away from the body 11 (that is, the second outer side-surface 132) and is fused to a side surface of the second recessed platform 14 away from the body 11 (that is, the third outer side-surface 142). During heat fusion, a heat fusion press plate (such as a heated metal plate) is used to press the protective film tightly against the side surface of the first recessed platform 13 away from the body 11 and against the side surface of the second recessed platform 14 away from the body 11, so that the protective film and the plastic can be melted and fused into an integrated structure and fixed. Thanks to the arrangement of the first reinforcing ribs and the second reinforcing ribs, when the protective film is hot-melted, the protective film and the hot-melt platen will not squeeze and pull the first recessed platform 13 and the second recessed platform 14 to deform, thereby preventing heat fusion failure and connection failure.

Each of the multiple first reinforcing ribs 137 has a third surface 1371. Each of the multiple second reinforcing ribs 147 has a fourth surface 1471. Each of the third surface 1371 and the fourth surface 1471 is flush with the first surface 111, and has the second surface-roughness.

Due to the small size of the rib, it is difficult for the push rod to push the third surface 1371 and the fourth surface 1471 for demolding. Therefore, each of the third surface 1371 and the fourth surface 1471 is set to have the second surface-roughness to facilitate demolding. The design of the second surface-roughness is conducive to demolding. For details, reference can be made to the previous description, which is not repeated here.

Figure 8:
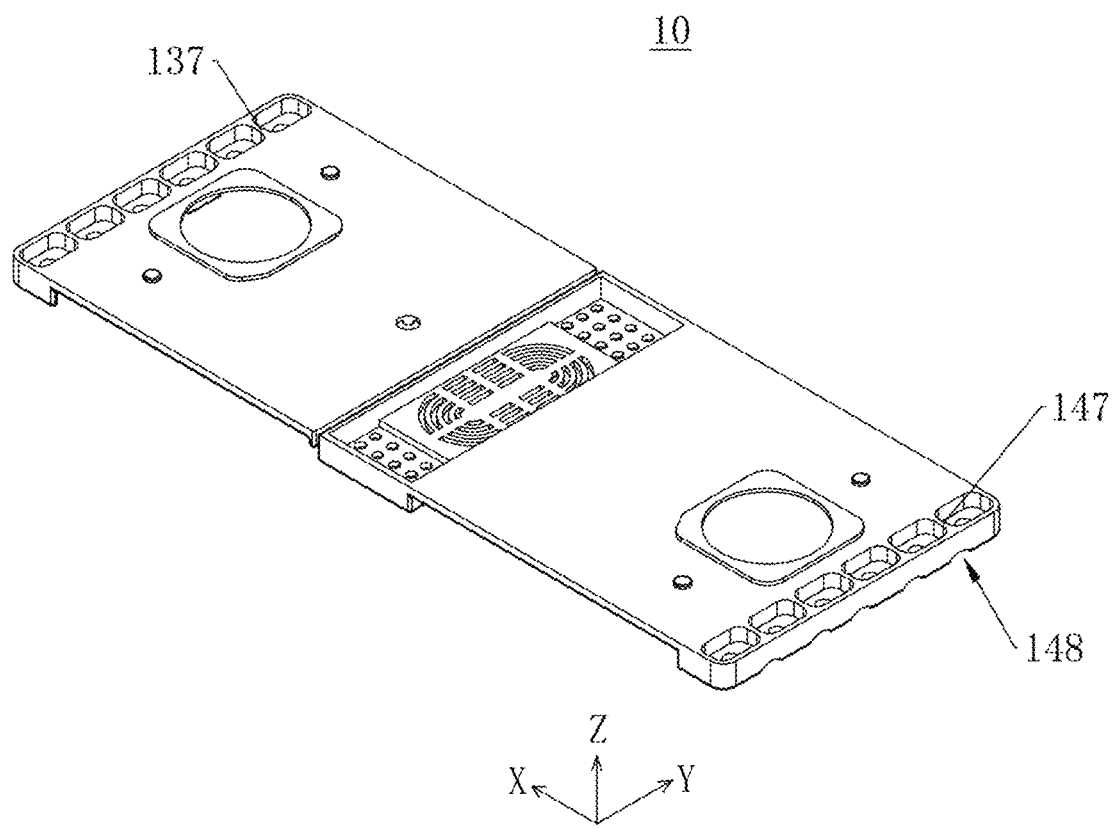
FIG. 8 is a perspective view of a lower plastic member according to another embodiment.
Figure 9:
FIG. 9 is a side view of a lower plastic member according to another embodiment.
Figure 10:
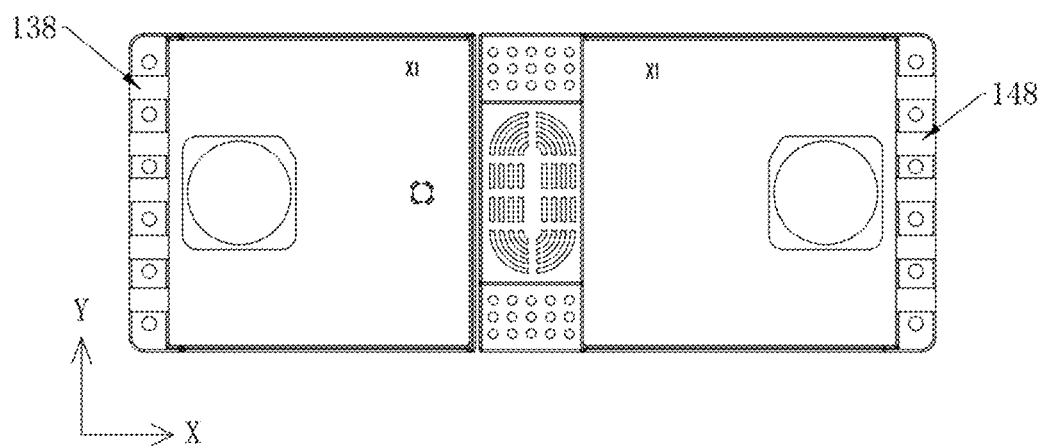
FIG. 10 is a bottom view of a lower plastic member according to another embodiment.

In an embodiment, as illustrated in FIG. 8 to FIG. 10, each of the multiple first reinforcing ribs 137 has a dimension (that is, thickness) ranging from 0.85 mm to 3.65 mm in the width direction of the body 11 (that is, the second direction Y) of the body 11. Each of the multiple second reinforcing ribs 147 has a dimension (that is, thickness) ranging from 0.85 mm to 3.65 mm in the width direction of the body 11 (that is, the second direction Y) of the body 11. The first recessed platform 13 defines multiple first recesses 138 in the second top surface 131 in a one-to-one correspondence with the multiple first reinforcing ribs 137. The second recessed platform 14 defines multiple second recesses 148 in the third top surface 141 in a one-to-one correspondence with the multiple second reinforcing rib 147. Each of the multiple first recesses 138 is recessed from the second top surface 131 and extends through two opposite outer side-surfaces (that is, the second outer side-surface 132) of the first recessed platform 13 in the length direction (that is, the first direction X) of the body 11. Each of the multiple second recesses 148 is recessed from the third top surface 141 and extends through two opposite outer side-surfaces (that is, the third outer side-surface 142) of the second recessed platform 14 in the length direction of the body 11.

Two opposite side-surfaces of the first reinforcing rib 137 may both be flat surfaces, or one of which may be a flat surface and the other of which may be a curved surface, or both of which may be curved surfaces. Two opposite side-surfaces of the second reinforcing rib 147 may both be flat surfaces, or one of which may be a flat surface and the other of which may be a curved surface, or both of which may be curved surfaces. The shapes of the first reinforcing rib 137 and the second reinforcing rib 147 may be the same or different, which is not limited. The thickness of each of the first reinforcing rib 137 and the second reinforcing rib 147 refers to the average thickness or the minimum thickness. The thickness of the first reinforcing rib 137 and the second reinforcing rib 147 may specifically be 0.85 mm, 1 mm, 1.5 mm, 2 mm, 2.5 mm, 3 mm, 3.5 mm, 3.65 mm, etc., which is not limited. The thickness of the first reinforcing rib 137 and the thickness of the second reinforcing rib 147 may be equal or unequal, which is not limited.

On condition that each of the thickness of the first reinforcing rib 137 and the thickness of the second reinforcing rib 147 ranges from 0.85 mm to 3.65 mm, when the injection molding is performed, during solidification of plastic liquid, the plastic at the position of the second top surface 131 corresponding to the first reinforcing rib 137 will shrink towards the first reinforcing rib 137 to define the first recess 138, and the plastic at the position of the third top surface 141 corresponding to the second reinforcing rib 147 will shrink towards the second reinforcing rib 147 to define the second recess 148.

After the lower plastic member 10 is mounted to the energy storage apparatus 1000, each of the second top surface 131 and the third top surface 141 is in contact with the cell assembly, and there is a gap between the cell assembly and each of the first recess 138 and the second recess 148. When the electrolyte is injected into the energy storage apparatus 1000, and the electrolyte reaches a surface of the cell assembly positioned facing towards the lower plastic member 10, the electrolyte can flow to a sidewall surface and a bottom-wall surface of the cell assembly through the first recesses 138 and the second recesses 148, to infiltrate the cell assembly from all directions, so that the infiltration efficiency is improved and the infiltration uniformity is ensured.

Meanwhile, the first recess 138 and the second recess 148 can be used for ventilation. When the cell assembly generates gas, the gas can enter the space between the second surface 112 and the cell assembly through the first recess 138 and the second recess 148, and then enter the gas collecting groove 123 through the vent hole. When a gas pressure is greater than a preset value, the pressure can be released through an explosion-proof valve, thereby improving the safety performance of the energy storage apparatus 1000.

In an embodiment, as illustrated in FIG. 2 and FIG. 6, a top surface of the first terminal-boss 15 protruding from the first surface 111 is a fourth top surface 151. A top surface of the second terminal-boss 16 protruding from the first surface 111 is a fifth top surface 161. Each of the fourth top surface 151 and the fifth top surface 161 has the second surface-roughness.

As illustrated in conjunction with FIG. 4 and FIG. 5, when the first boss 121 and the second boss 122 are demolded from the first mold 21, it is not necessary to use push rods to push the fourth top surface 151 and the fifth top surface 161. Instead, it is sufficient to set the fourth surface 1471 and the fifth surface each to have the second surface-roughness. The rougher surface can be conducive to demolding. For the specific principle, reference can be made to the previous description, which is not be repeated.

Optionally, as illustrated in FIG. 2, the first terminal-boss 15 has a fourth outer side-surface 152. The second terminal-boss 16 has a fifth outer side-surface 162. The fourth outer surface 152 is connected to the first surface 111 and the fourth top surface 151. The fifth outer surface 162 is connected to the first surface 111 and the fifth top surface 161. Each of fourth outer side-surface 152 and the fifth outer side-surface 162 has the first surface-roughness.

The fourth outer side-surface 152 is a peripheral side-surface of the first terminal-boss 15. The fifth outer side-surface 162 is a peripheral side-surface of the second terminal-boss 16. The fourth outer side-surface 152 and the fifth outer side-surface 162 each extend in the third direction Z.

As illustrated in conjunction with FIG. 4 and FIG. 5, during injection molding, the sidewalls of the first molding grooves 212 on the first molding surface 211 of the first mold 21 is configured to form the fourth outer side-surface 152 and the fifth outer side-surface 162. During demolding, the sidewall of the first molding groove 212 (that is, the sidewall extending in the third direction Z), and each of the fourth outer side-surface 152 and the fifth outer side-surface 162 will rub against each other.

By setting the fourth outer side-surface 152 and the fifth outer side-surface 162 each to have the first surface-roughness, the fourth outer side-surface 152 and the fifth outer side-surface 162 are relatively flat and smooth, so that the friction force between the first mold 21 and each of the fourth outer side-surface 152 and the fifth outer side-surface 162 can be reduced. Therefore, it is conducive to demolding, the deformation of the lower plastic member 10 caused by the pulling of the first mold 21 is avoided, and thus the product yield is prevented from being reduced.

Optionally, as illustrated in FIG. 2, FIG. 3, and FIG. 7, each of the first terminal-boss 15 and the second terminal-boss 16 are recessed relative to the second surface 112. The first terminal-boss 15 defines the first terminal-groove 153. The second terminal-boss 16 defines the second terminal-groove 163. A sidewall of the first terminal-groove 153 is a fourth inner sidewall 154. A sidewall of the second terminal-groove 163 is a fifth inner sidewall 164. Each of the fourth inner sidewall 154 and the fifth inner sidewall 164 has the first surface-roughness.

As illustrated in conjunction with FIG. 4 and FIG. 5, during injection molding, multiple protrusions on the second molding surface 221 of the second mold 22 are configured to form the first terminal-groove 153 and the second terminal-groove 163. During demolding, the outer surfaces of the protrusions of the second mold 22 (that is, the outer surface extending in the third direction Z), and each of the fourth inner sidewall 154 and the fifth inner sidewall 164 will rub against each other.

By setting the fourth inner sidewall 154 and the fifth inner sidewall 164 each to have the first surface-roughness, the fourth inner sidewall 154 and the fifth inner sidewall 164 are relatively flat and smooth, so that the friction force between the second mold 22 and each of the fourth inner sidewall 154 and the fifth inner sidewall 164 can be reduced. Therefore, it is conducive to demolding, the deformation of the lower plastic member 10 caused by the pulling of the second mold 22 can be avoided, and thus the product yield is prevented from being reduced.

Optionally, as illustrated in FIG. 3 and FIG. 7, a bottom wall of the first terminal-groove 153 is a fourth bottom wall 155. A bottom wall of the second terminal-groove 163 is a fifth bottom wall 165. Each of the fourth bottom wall 155 and the fifth bottom wall 165 has the first surface-roughness.

Referring to FIG. 2 and FIG. 3, the first terminal-boss 15 defines a first terminal-hole 156. The first terminal-hole 156 extends through the fourth top surface 151 and the fourth bottom wall 155. The second terminal-boss 16 defines a second terminal-hole 166. The second terminal-hole 166 extends through the fifth top surface 161 and the fifth bottom wall 165. To reasonably control the size to ensure the structural strength of the lower plastic member 10, the first terminal-hole 156 and the second terminal-hole 166 are relatively large in size. In other words, the fourth bottom wall 155 and the fifth bottom wall 165 are substantially annular in shape, and each have a relatively small area, so that the fourth bottom wall 155 and the fifth bottom wall 165 can be easily separated from the second mold 22 during demolding. Based on this, the fourth bottom wall 155 and the fifth bottom wall 165 are set to have the first surface-roughness, which does not cause difficulty in demolding or the deformation of the lower plastic member 10 by pulling. In addition, the fourth bottom wall 155 and the fifth bottom wall 165 are relatively flat and smooth, so that when the first terminal and the second terminal are mounted, the fourth bottom wall 155 can be in closer contact with the first disc of the first terminal, and the fifth bottom wall 165 can be in closer contact with the second disc of the second terminal, thereby improving the connection stability.

Optionally, as illustrated in FIG. 2 and FIG. 6, a top surface of the anti-rotation post 17 protruding from the first surface 111 is a sixth top surface 171. An outer peripheral surface of the anti-rotation post 17 is connected to the first surface 111 and the sixth top surface 171, and has the first surface-roughness. The sixth top surface 171 has the second surface-roughness.

The outer peripheral surface of the anti-rotation post 17 substantially extends in the third direction Z.

Referring to FIG. 4 and FIG. 5, during injection molding, the sidewall of the first molding groove 212 on the first molding surface 211 of the first mold 21 is further configured to form the outer peripheral surface of the anti-rotation post 17. During demolding, the sidewall of the first molding groove 212 (that is, the sidewall extending in the third direction Z) and the outer peripheral surface of the anti-rotation post 17 will rub against each other.

By setting the outer peripheral surface of the anti-rotation post 17 to have the first surface-roughness, the outer peripheral surface is relatively flat and smooth, so that the friction force between the first mold 21 and the outer peripheral surface can be reduced. Therefore, it is conducive to demolding, the deformation of the lower plastic member caused by the pulling of the first mold 21 can be avoided, and thus the product yield is prevented from being reduced.

In addition, a radial dimension of the anti-rotation post 17 is relatively small, that is, an area of the sixth top surface 171 is relatively small. By setting the sixth top surface 171 to have the second surface-roughness, the sixth top surface 171 is relatively rough, so that it is conducive to demolding, and it is not necessary to use the push rod to push the sixth top surface 171.

To sum up, most of two corresponding surfaces of the lower plastic member 10 have different surface roughnesses. For example, the first surface 111 has the first surface-roughness and the corresponding second surface 112 has the second surface-roughness, and the second bottom wall 135 corresponding to the first surface 111 has the first surface-roughness. The second bottom wall 135 have the first surface-roughness, and the second top surface 131 corresponding to the second bottom wall 135 has the second surface-roughness. The third bottom wall 145 has the first surface-roughness, and the third top surface 141 corresponding to the third bottom wall 145 has the second surface-roughness. The fourth bottom wall 155 has the first surface-roughness, and the fourth top surface 151 corresponding to the fourth bottom wall 155 has the second surface-roughness. The fifth bottom wall 165 has the first surface-roughness, and the fifth top surface 161 corresponding to the fifth bottom wall 165 has the second surface-roughness.

A few corresponding surfaces of the lower plastic member 10 have the same surface roughness. For example, each of the first bottom wall and the first top surface has the second surface-roughness.

Therefore, the surface of the lower plastic member 10 positioned facing towards the upper cover (that is, the first surface 111, the third bottom wall 145, the fourth bottom wall 155, and the fifth bottom wall 165) is smoother than the surface of the lower plastic member 10 positioned facing away from the upper cover, so that it is easier for the electrolyte to flow and fall back to the cell assembly. In addition, during injection molding, it is easier for the second mold 22 to be separated from the lower plastic member 10 than the first mold 21, so that the local deformation of the lower plastic member 10 caused by the movement of the lower plastic member 10 driven by the movement of the second mold 22, can be avoided.

In addition, the outer side-surface and inner sidewall of each protrusion is set to have the first surface-roughness, so that during demolding, the friction force between the mold and the lower plastic member 10 can be reduced and the demolding efficiency can be improved.

In an embodiment, as illustrated in FIG. 6, the first surface 111 has a micro-texture 18. The micro-texture 18 extends in the length direction of the body 11 or the width direction of the body 11. A dimension of the micro-texture 18 protruding or recessed relative to the first surface 111 ranges from 0.01 mm to 0.05 mm.

The micro-texture 18 may be a protrusion or a groove, extending along a straight line, relative to the first surface 111. The micro-texture 18 is formed by a micro-structure on the first molding surface 211 of the first mold 21 as shown in FIG. 4 and FIG. 5. The micro-texture 18 can guide the electrolyte remaining on the first surface 111 to flow in an extension direction of the micro-texture 18, so that the electrolyte on the first surface 111 can be quickly guided to the edge of the first surface 111 and flow to the cell assembly. When the micro-texture 18 extends in the length direction of the body 11, the electrolyte flows in the length direction of the body 11 under the guidance of the micro-texture 18, then flows into the first groove 133 and the second groove 143, and finally flows to the cell assembly through the first leakage hole 136 and the second leakage hole 146. When the micro-texture 18 extends in the width direction of the body 11, the electrolyte flows in the width direction of the body 11 under the guidance of the micro-texture 18, and then flows to the cell assembly from both edges of the first surface 111 in the width direction of the body 11.

There may be multiple micro-textures 18 extending in the same direction. It may be understood that for the same lower plastic member 10, the micro-textures 18 disposed on the first surface 111 only extend in one direction, that is, either in the length direction of the body 11 or the width direction of the body 11. The micro-textures 18 cannot simultaneously extend in both the length direction of the body 11 and the width direction of the body 11, to avoid the electrolyte retention at the intersections of the micro-textures 18 in different directions.

The dimension of the micro-texture 18 protruding or recessed relative to the first surface 111 may specifically be 0.01 mm, 0.02 mm, 0.03 mm, 0.04 mm, 0.05 mm, etc., which is not limited. The dimension of the micro-texture 18 protruding or recessed relative to the first surface 111 is relatively small, which is negligible relative to the thickness of the body 11 (that is, the dimension of the body 11 in the third direction Z) and has no influence on the structural strength of the body 11.

In an embodiment, as illustrated in FIG. 2 and FIG. 3, the lower plastic member 10 is bent in the width direction of the lower plastic member 10 (that is, the second direction Y). Two ends of the lower plastic member 10 in the width direction of the lower plastic member are configured to be farther away from the upper cover than a middle part of the lower plastic member 10 in the width direction of the lower plastic member 10.

In the mounting process of the lower plastic member 10 to form the energy storage apparatus 1000, protective films are fused onto the two opposite side surfaces of the explosion-proof recessed platform 12 in the width direction of the body 11 (that is, the second direction Y). Under the dual effects of gravity and the pulling force of the protective film, the resilience and strength of the lower plastic member 10 decrease over prolonged use of the energy storage apparatus 1000. Consequently, the two ends of the lower plastic member 10 in the second direction Y sag slightly, that is, the two ends of the lower plastic member 10 in the second direction Y sag towards the cell assembly. Compared to initial mounting of the lower plastic member 10, the two ends of the lower plastic member 10 in the second direction Y become further from the upper cover. For example, at the time of initial mounting, the upper surface of the lower plastic member 10 (that is, surfaces on the first surface 111) is in close contact with the lower surface of the upper cover (that is, the surface of the upper cover positioned facing towards the cell assembly). After a period of use, gaps may be defined between the two ends of the lower plastic member 10 in the second direction Y and the lower surface of the upper cover.

The lower plastic member 10 is bent in the second direction Y, and the two ends of the lower plastic member 10 in the width direction of the lower plastic member 10 are set to be farther away from the upper cover than the middle part of the lower plastic member 10 in the width direction of the lower plastic member 10, so that the electrolyte on the first surface 111 can flow faster, the electrolyte is prevented from adhering to a gap between the first surface 111 of the lower plastic member 10 and the lower surface of the upper cover due to surface tension, and thus the electrolyte is able to flow back.

As illustrated in FIG. 3, the lower plastic member 10 further includes multiple connecting ribs 19, which are disposed at the edge of the second surface 112 in the width direction of the body 11. Two ends of each of two of the multiple connecting ribs 19 are respectively connected to the explosion-proof recessed platform 12 and the first recessed platform 13, and two ends of each of the other two of the multiple connecting ribs 19 are respectively connected to the explosion-proof recessed platform 12 and the second recessed platform 14. The thickness dimension of the connecting rib 19 (that is, the dimension in the second direction Y) is relatively small, which is negligible relative to the width of the body 11 (that is, the dimension in the second direction Y). The connecting ribs 19 are configured to strengthen the structural strength at the edge of the body 11 in the width direction and avoid bending deformation at the edge of the body 11. The height of the connecting rib 19 protruding relative to the second surface 112 is also relatively small, and is significantly less than the height of each of the explosion-proof recessed platform 12, the first recessed platform 13, and the second recessed platform 14 protruding relative to the second surface 112. Therefore, the connecting rib 19 can be easily demolded, and there is no requirement for the surface roughness of the connecting rib 19. In other words, the surface roughness of the connecting rib 19 can be the aforementioned first surface-roughness or second surface-roughness, which is not limited.

Other structures, such as injection avoidance holes, buckles, coding structures, push points, etc., can also be provided on the lower plastic member 10 in embodiments of the present disclosure, which are not limited in the present disclosure.

In the description of embodiments of the present disclosure, it should be noted that terms such as "center," "upper," "lower," "left," "right," "vertical," "horizontal," "inner," "outer," and other indicators of orientation or positional relationships are based on the orientation or positional relationships described in the accompanying drawings. These terms are provided merely for the convenience of describing the present disclosure and simplifying the description and are not intended to indicate or imply that the referred apparatus or element must have a specific orientation, be constructed, or operate in a specific orientation. Therefore, these terms cannot be construed as limitations to the present disclosure.

What has been disclosed above is only a preferred embodiment of the present disclosure and cannot be used to limit the scope of the present disclosure. Those of ordinary skill in the art can understand that, all or part of the processes of realizing the above embodiments and the equivalent changes made according to the claims of the present disclosure, still fall within the scope of the present disclosure.

What is claimed is:

1. A lower plastic member for an end cover assembly of an energy storage apparatus, comprising:
    a body, having a first surface and a second surface positioned facing away from the first surface, wherein the first surface is configured to be positioned at one side of the body facing towards an upper cover;
    an explosion-proof recessed platform, disposed at a middle part of the body in a length direction of the body and protruding relative to the second surface, wherein a top surface of the explosion-proof recessed platform protruding from the second surface is a first top surface, the explosion-proof recessed platform is recessed relative to the first surface, the explosion-proof recessed platform defines a gas collecting groove, and a bottom wall of the gas collecting groove is a first bottom wall;
    a first recessed platform, disposed at one end of the body in the length direction of the body and protruding relative to the second surface, wherein a top surface of the first recessed platform protruding from the second surface is a second top surface, the first recessed platform is recessed relative to the first surface, the first recessed platform defines a first groove, and a bottom wall of the first groove is a second bottom wall;
    a second recessed platform, disposed at one end of the body away from the first recessed platform in the length direction of the body and protruding relative to the second surface, wherein a top surface of the second recessed platform protruding from the second surface is a third top surface, and the second recessed platform is recessed relative to the first surface, the second recessed platform defines a second groove, and a bottom wall of the second groove is a third bottom wall;
    a first terminal-boss, disposed at the body and between the explosion-proof recessed platform and the first recessed platform, wherein the first terminal-boss protrudes relative to the first surface, a top surface of the first terminal-boss protruding from the first surface is a fourth top surface, the first terminal-boss is recessed relative to the second surface, the first terminal-boss defines a first terminal-groove, and a bottom wall of the first terminal-groove is a fourth bottom wall; and a second terminal-boss, disposed at the body and between the explosion-proof recessed platform and the second recessed platform, wherein the second terminal-boss protrudes relative to the first surface, a top surface of the second terminal-boss protruding from the first surface is a fifth top surface, the second terminal-boss is recessed relative to the second surface, the second terminal-boss defines a second terminal-groove, and a bottom wall of the second terminal-groove is a fifth bottom wall; wherein the first surface is corresponding to the second surface, the first top surface is corresponding to the first bottom wall, the second top surface is corresponding to the second bottom wall, the third top surface is corresponding to the third bottom wall, the fourth top surface is corresponding to the fourth bottom wall, and the fifth top surface is corresponding to the fifth bottom wall;

each of the first surface, the second bottom wall, the third bottom wall, the fourth bottom wall, and the fifth bottom wall has a first surface-roughness A, each of the second surface, the first bottom wall, the first top surface, the second top surface, the third top surface, the fourth top surface, and the fifth top surface has a second surface-roughness B, and the first surface-roughness A and the second surface-roughness B satisfy: A<B; and the first surface-roughness A and the second surface-roughness B further satisfy: Ra0.02≤A≤Ra1.6, and Ra0.8≤B≤Ra12.5.

2. The lower plastic member of claim 1, wherein the explosion-proof recessed platform comprises one first boss and two second bosses, the first boss is disposed at a middle part of the body in a width direction of the body, two ends of the first boss in the width direction of the body are connected to the two second bosses, respectively, a height of the first boss protruding relative to the second surface is less than a height of each second boss protruding relative to the second surface, the first top surface comprises a first top sub-surface and two second top sub-surfaces, a top surface of the first boss protruding from the second surface is the first top sub-surface, top surfaces of the two second bosses protruding from the second surface are the two second top sub-surfaces, and each of the first top sub-surface and the two second top sub-surfaces has the second surface-roughness.

3. The lower plastic member of claim 2, wherein the first bottom wall comprises a first bottom sub-wall and two second bottom sub-walls; and a depth of the first boss recessed relative to the first surface is less than a depth of each second boss recessed relative to the first surface, part of the bottom wall of the gas collecting groove corresponding to the first boss is the first bottom sub-wall, parts of the bottom wall of the gas collecting groove corresponding to the two second bosses are the two second bottom sub-walls, and each of the first bottom sub-wall and the two second bottom sub-walls has the second surface-roughness.

4. The lower plastic member of claim 1, wherein the explosion-proof recessed platform has a first outer side-surface, the first recessed platform has a second outer side-surface, the second recessed platform has a third outer side-surface, the first outer side-surface is connected to the second surface and the first top surface, the second outer side-surface is connected to the second surface and the second top surface, the third outer side-surface is connected to the second surface and the third top surface, and each of the first outer side-surface, the second outer side-surface, and the third outer side-surface has the first surface-roughness.

5. The lower plastic member of claim 1, wherein a sidewall of the gas collecting groove is a first inner sidewall, a sidewall of the first groove is a second inner sidewall, a sidewall of the second groove is a third inner sidewall, and each of the first inner sidewall, the second inner sidewall, and the third inner sidewall is connected to the first surface, and has the first surface-roughness.

6. The lower plastic member of claim 1, further comprising a plurality of first reinforcing ribs and a plurality of second reinforcing ribs, wherein the plurality of first reinforcing ribs all extend in the length direction of the body and are arranged at intervals in a width direction of the body, the plurality of second reinforcing ribs all extend in the length direction of the body and are arranged at intervals in the width direction of the body, each of the plurality of first reinforcing ribs is connected to two opposite sidewalls of the first groove in the length direction of the body and the bottom wall of the first groove, each of the plurality of second reinforcing ribs is connected to two opposite sidewalls of the second groove in the length direction of the body and the bottom wall of the second groove, each of the plurality of first reinforcing ribs has a third surface, each of the plurality of second reinforcing ribs has a fourth surface, and each of the third surface and the fourth surface is flush with the first surface, and has the second surface-roughness.

7. The lower plastic member of claim 6, wherein each of the plurality of first reinforcing ribs has a dimension ranging from 0.85 mm to 3.65 mm in the width direction of the body, each of the plurality of second reinforcing ribs has a dimension ranging from 0.85 mm to 3.65 mm in the width direction of the body, the first recessed platform defines a plurality of first recesses in the second top surface in a one-to-one correspondence with the plurality of first reinforcing ribs, the second recessed platform defines a plurality of second recesses in the third top surface in a one-to-one correspondence with the plurality of second reinforcing ribs, each of the plurality of first recesses is recessed from the second top surface and extends through two opposite outer side-surfaces of the first recessed platform in the length direction of the body, and each of the plurality of second recesses is recessed from the third top surface and extends through two opposite outer side-surfaces of the second recessed platform in the length direction of the body.

8. The lower plastic member of claim 1, wherein the first terminal-boss has a fourth outer side-surface, the second terminal-boss has a fifth outer side-surface, the fourth outer side-surface is connected to the first surface and the fourth top surface, the fifth outer side-surface is connected to the first surface and the fifth top surface, and each of the fourth outer side-surface and the fifth outer side-surface has the first surface-roughness.

9. The lower plastic member of claim 1, wherein a sidewall of the first terminal-groove is a fourth inner sidewall, a sidewall of the second terminal-groove is a fifth inner sidewall, and each of the fourth inner sidewall and the fifth inner sidewall has the first surface-roughness.

10. The lower plastic member of claim 1, further comprising an anti-rotation post connected to the body and protruding from the first surface, wherein a top surface of the anti-rotation post protruding from the first surface is a sixth top surface, an outer peripheral surface of the anti-rotation post is connected to the first surface and the sixth top surface and has the first surface-roughness, and the sixth top surface has the second surface-roughness.

11. The lower plastic member of claim 1, wherein the first surface has a micro-texture, the micro-texture extends in the length direction of the body or a width direction of the body, and a dimension of the micro-texture protruding or recessed relative to the first surface ranges from 0.01 mm to 0.05 mm.

12. The lower plastic member of claim 1, wherein the lower plastic member is bent in a width direction of the lower plastic member, and two ends of the lower plastic member in the width direction of the lower plastic member are configured to be farther away from the upper cover than a middle part of the lower plastic member in the width direction of the lower plastic member.

13. An end cover assembly, comprising an upper cover and a lower plastic member, wherein the lower plastic member comprises:
- a body, having a first surface and a second surface positioned facing away from the first surface, wherein the first surface is configured to be positioned at one side of the body facing towards an upper cover;
- an explosion-proof recessed platform, disposed at a middle part of the body in a length direction of the body and protruding relative to the second surface, wherein a top surface of the explosion-proof recessed platform protruding from the second surface is a first top surface, the explosion-proof recessed platform is recessed relative to the first surface, the explosion-proof recessed platform defines a gas collecting groove, and a bottom wall of the gas collecting groove is a first bottom wall;
- a first recessed platform, disposed at one end of the body in the length direction of the body and protruding relative to the second surface, wherein a top surface of the first recessed platform protruding from the second surface is a second top surface, the first recessed platform is recessed relative to the first surface, the first recessed platform defines a first groove, and a bottom wall of the first groove is a second bottom wall;
- a second recessed platform, disposed at one end of the body away from the first recessed platform in the length direction of the body and protruding relative to the second surface, wherein a top surface of the second recessed platform protruding from the second surface is a third top surface, and the second recessed platform is recessed relative to the first surface, the second recessed platform defines a second groove, and a bottom wall of the second groove is a third bottom wall;
- a first terminal-boss, disposed at the body and between the explosion-proof recessed platform and the first recessed platform, wherein the first terminal-boss protrudes relative to the first surface, a top surface of the first terminal-boss protruding from the first surface is a fourth top surface, the first terminal-boss is recessed relative to the second surface, the first terminal-boss defines a first terminal-groove, and a bottom wall of the first terminal-groove is a fourth bottom wall; and
- a second terminal-boss, disposed at the body and between the explosion-proof recessed platform and the second recessed platform, wherein the second terminal-boss protrudes relative to the first surface, a top surface of the second terminal-boss protruding from the first surface is a fifth top surface, the second terminal-boss is recessed relative to the second surface, the second terminal-boss defines a second terminal-groove, and a bottom wall of the second terminal-groove is a fifth bottom wall; wherein
- the first surface is corresponding to the second surface, the first top surface is corresponding to the first bottom wall, the second top surface is corresponding to the second bottom wall, the third top surface is corresponding to the third bottom wall, the fourth top surface is corresponding to the fourth bottom wall, and fifth top surface is corresponding to the fifth bottom wall;
- each of the first surface, the second bottom wall, the third bottom wall, the fourth bottom wall, and the fifth bottom wall has a first surface-roughness A, each of the second surface, the first bottom wall, the first top surface, the second top surface, the third top surface, the fourth top surface, and the fifth top surface has a second surface-roughness B, and the first surface-roughness A and the second surface-roughness B satisfy: A<B;
- the first surface-roughness A and the second surface-roughness B further satisfy: Ra0.02≤A≤Ra1.6, and Ra0.8≤B≤Ra12.5; and
- the first surface of the lower plastic member is positioned facing towards the upper cover.

14. The end cover assembly of claim 13, wherein the explosion-proof recessed platform comprises one first boss and two second bosses, the first boss is disposed at a middle part of the body in a width direction of the body, two ends of the first boss in the width direction of the body are connected to the two second bosses, respectively, a height of the first boss protruding relative to the second surface is less than a height of each second boss protruding relative to the second surface, the first top surface comprises a first top sub-surface and two second top sub-surfaces, a top surface of the first boss protruding from the second surface is the first top sub-surface, top surfaces of the two second bosses protruding from the second surface are the two second top sub-surfaces, and each of the first top sub-surface and the two second top sub-surfaces has the second surface-roughness.

15. The end cover assembly of claim 13, wherein the explosion-proof recessed platform has a first outer side-surface, the first recessed platform has a second outer side-surface, the second recessed platform has a third outer side-surface, the first outer side-surface is connected to the second surface and the first top surface, the second outer side-surface is connected to the second surface and the second top surface, the third outer side-surface is connected to the second surface and the third top surface, and each of the first outer side-surface, the second outer side-surface, and the third outer side-surface has the first surface-roughness.

16. The end cover assembly of claim 13, wherein a sidewall of the gas collecting groove is a first inner sidewall, a sidewall of the first groove is a second inner sidewall, a sidewall of the second groove is a third inner sidewall, and each of the first inner sidewall, the second inner sidewall, and the third inner sidewall is connected to the first surface, and has the first surface-roughness.

17. The end cover assembly of claim 13, wherein the lower plastic member further comprises a plurality of first reinforcing ribs and a plurality of second reinforcing ribs, the plurality of first reinforcing ribs all extend in the length direction of the body and are arranged at intervals in a width direction of the body, the plurality of second reinforcing ribs all extend in the length direction of the body and are arranged at intervals in the width direction of the body, each of the plurality of first reinforcing ribs is connected to two opposite sidewalls of the first groove in the length direction of the body and the bottom wall of the first groove, each of the plurality of second reinforcing ribs is connected to two opposite sidewalls of the second groove in the length direction of the body and the bottom wall of the second groove, each of the plurality of first reinforcing ribs has a third surface, each of the plurality of second reinforcing ribs has a fourth surface, and each of the third surface and the fourth surface is flush with the first surface, and has the second surface-roughness.

18. The end cover assembly of claim 13, wherein the first terminal-boss has a fourth outer side-surface, the second terminal-boss has a fifth outer side-surface, the fourth outer side-surface is connected to the first surface and the fourth top surface, the fifth outer side-surface is connected to the first surface and the fifth top surface, and each of the fourth outer side-surface and the fifth outer side-surface has the first surface-roughness.

19. An energy storage apparatus, comprising a housing, a cell assembly, and an end cover assembly, wherein the end cover assembly comprises an upper cover and a lower plastic member, and the lower plastic member comprises:
   a body, having a first surface and a second surface positioned facing away from the first surface, wherein the first surface is configured to be positioned at one side of the body facing towards an upper cover;
   an explosion-proof recessed platform, disposed at a middle part of the body in a length direction of the body and protruding relative to the second surface, wherein a top surface of the explosion-proof recessed platform protruding from the second surface is a first top surface, the explosion-proof recessed platform is recessed relative to the first surface, the explosion-proof recessed platform defines a gas collecting groove, and a bottom wall of the gas collecting groove is a first bottom wall;
   a first recessed platform, disposed at one end of the body in the length direction of the body and protruding relative to the second surface, wherein a top surface of the first recessed platform protruding from the second surface is a second top surface, the first recessed platform is recessed relative to the first surface, the first recessed platform defines a first groove, and a bottom wall of the first groove is a second bottom wall;
   a second recessed platform, disposed at one end of the body away from the first recessed platform in the length direction of the body and protruding relative to the second surface, wherein a top surface of the second recessed platform protruding from the second surface is a third top surface, and the second recessed platform is recessed relative to the first surface, the second recessed platform defines a second groove, and a bottom wall of the second groove is a third bottom wall;
   a first terminal-boss, disposed at the body and between the explosion-proof recessed platform and the first recessed platform, wherein the first terminal-boss protrudes relative to the first surface, a top surface of the first terminal-boss protruding from the first surface is a fourth top surface, the first terminal-boss is recessed relative to the second surface, the first terminal-boss defines a first terminal-groove, and a bottom wall of the first terminal-groove is a fourth bottom wall; and
   a second terminal-boss, disposed at the body and between the explosion-proof recessed platform and the second recessed platform, wherein the second terminal-boss protrudes relative to the first surface, a top surface of the second terminal-boss protruding from the first surface is a fifth top surface, the second terminal-boss is recessed relative to the second surface, the second terminal-boss defines a second terminal-groove, and a bottom wall of the second terminal-groove is a fifth bottom wall; wherein
   the first surface is corresponding to the second surface, the first top surface is corresponding to the first bottom wall, the second top surface is corresponding to the second bottom wall, the third top surface is corresponding to the third bottom wall, the fourth top surface is corresponding to the fourth bottom wall, and fifth top surface is corresponding to the fifth bottom wall;
   each of the first surface, the second bottom wall, the third bottom wall, the fourth bottom wall, and the fifth bottom wall has a first surface-roughness A, each of the second surface, the first bottom wall, the first top surface, the second top surface, the third top surface, the fourth top surface, and the fifth top surface has a second surface-roughness B, and the first surface-roughness A and the second surface-roughness B satisfy: A<B;
   the first surface-roughness A and the second surface-roughness B further satisfy: Ra0.02≤A≤Ra1.6, and Ra0.8≤B≤Ra12.5;
   the first surface of the lower plastic member is positioned facing towards the upper cover; and
   the cell assembly is disposed in the housing, and the end cover assembly is connected to the housing.

20. A power consuming device, comprising a power consuming apparatus and the energy storage apparatus of claim 19, wherein the energy storage apparatus is configured to supply power to the power consuming apparatus.

* * * * *